United States Patent
Kusumoto et al.

(10) Patent No.: US 11,320,513 B2
(45) Date of Patent: May 3, 2022

(54) PORTABLE DEVICE POSITION ESTIMATION SYSTEM

(71) Applicant: DENSO CORPORATION, Kariya (JP)

(72) Inventors: Tetsuya Kusumoto, Nisshin (JP); Kenichiro Sanji, Nisshin (JP); Takashi Shinoda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/168,576

(22) Filed: Feb. 5, 2021

(65) Prior Publication Data

US 2021/0181294 A1 Jun. 17, 2021

Related U.S. Application Data

(63) Continuation of application No. PCT/JP2019/026012, filed on Jul. 1, 2019.

(30) Foreign Application Priority Data

Aug. 10, 2018 (JP) .............................. JP2018-151310

(51) Int. Cl.
 *G01S 5/10* (2006.01)
 *G01S 5/02* (2010.01)
 *H04W 64/00* (2009.01)

(52) U.S. Cl.
 CPC .............. *G01S 5/10* (2013.01); *G01S 5/0252* (2013.01); *G01S 5/0289* (2013.01); *H04W 64/006* (2013.01)

(58) Field of Classification Search
 CPC ........ G01S 5/10; G01S 5/0252; G01S 5/0289; G01S 13/765; H04W 64/006; B60R 25/245
 See application file for complete search history.

(56) References Cited

U.S. PATENT DOCUMENTS 7,013,147 B1   3/2006 Kuwahara et al.
2005/0035897 A1*   2/2005 Perl .......................... G01S 5/12
                                                                342/29

(Continued)

FOREIGN PATENT DOCUMENTS

JP    H05142326 A    6/1993
JP    H0915314 A    1/1997
JP    3573039 B2    10/2004

(Continued)

*Primary Examiner* — Michael Y Mapa
(74) *Attorney, Agent, or Firm* — Harness, Dickey & Pierce, P.L.C.

(57) ABSTRACT

In a portable device position estimation system, a vehicle-mounted system includes a transceiver and intercept devices. The vehicle-mounted system determines a first propagation time being a propagation time of a wireless signal from the transceiver to a portable device, based on a round trip time being a time between the transceiver transmitting a response request signal and the transceiver receiving a response signal from the portable device. The vehicle-mounted system determines a second propagation time being a propagation time of a wireless signal from the portable device to the intercept device based on the round trip time and a signal reception interval being a time between the intercept device receiving the response request signal and the intercept device receiving the response signal.

10 Claims, 10 Drawing Sheets

(56) References Cited

U.S. PATENT DOCUMENTS

2016/0332597 A1    11/2016  Tokunaga et al.
2020/0031315 A1*   1/2020  Breer ...................... B60R 25/24

FOREIGN PATENT DOCUMENTS

| | | | |
|---|---|---|---|
| JP | 2011147104 A | 7/2011 | |
| JP | 2015131608 A | 7/2015 | |
| JP | 2015200516 A | 11/2015 | |
| JP | 2016038332 A | 3/2016 | |
| JP | 2017011330 A | 1/2017 | |
| JP | 6093647 B2 | 3/2017 | |
| JP | 2017173256 A | 9/2017 | |
| WO | WO-2009145325 A1 * | 12/2009 | ........... G01S 13/878 |

* cited by examiner

PORTABLE DEVICE POSITION ESTIMATION SYSTEM

CROSS-REFERENCE TO RELATED APPLICATIONS

The present application is a continuation application of PCT/JP2019/026012 filed on Jul. 1, 2019, which designated the U.S and claims the benefit of priority from Japanese Patent Application No. 2018-151310 filed on Aug. 10, 2018. The entire disclosures of all of the above applications are incorporated herein by reference.

TECHNICAL FIELD

The present disclosure relates to a portable device position estimation system that estimates a position of a portable device with respect to a vehicle based on a propagation time of a signal from the portable device to a communication device mounted to the vehicle.

BACKGROUND

Conventionally, various configurations have been proposed to estimate a position of a portable device with respect to a vehicle (that is, a portable device position estimation system) by means of wireless communication between a vehicle-mounted system mounted to the vehicle and the portable device carried by the user.

SUMMARY

In a first example of a portable device position estimation system, a vehicle-mounted system is configured to determine a first propagation time being a propagation time of a wireless signal from a transceiver of the vehicle-mounted system to a portable device, based on a round trip time being a period of time from when the transceiver transmits a response request signal to when the transceiver receives a response signal from the portable device. The vehicle-mounted system is configured to determine, for each of a plurality of intercept devices of the vehicle-mounted system, a second propagation time being a propagation time of a wireless signal from the portable device to the intercept device, based on: a signal reception interval being a period of time from when the intercept device receives the response request signal to when the intercept device receives the response signal; and the round trip time. The vehicle-mounted system estimates the position of the portable device based on the first propagation time and the second propagation times.

In a second example of a portable device position estimation system, a vehicle-mounted system includes a transceiver configured to, when the transceiver receives a response request signal from a portable device, transmit a response signal as a response. The vehicle-mounted system is configured to determine a first propagation time being a propagation time of a wireless signal from the transceiver to the portable device based on a round trip time indicated in a time difference notification signal transmitted from the portable device. The vehicle-mounted system is configured to determine, for each of interception devices of the vehicle-mounted system, a second propagation time being a propagation time of a wireless signal from the portable device to a respective intercept device, based on: a signal reception interval being a period of time from when the respective intercept device receives the response request signal to when the respective intercept device receives the response signal; and the round trip time, The vehicle-mounted system estimates the position of the portable device based on the first propagation time and the second propagation times.

BRIEF DESCRIPTION OF DRAWINGS

Objects, features and advantages of the present disclosure will become more apparent from the following detailed description with reference to the accompanying drawings.

DETAILED DESCRIPTION

Figure 1:
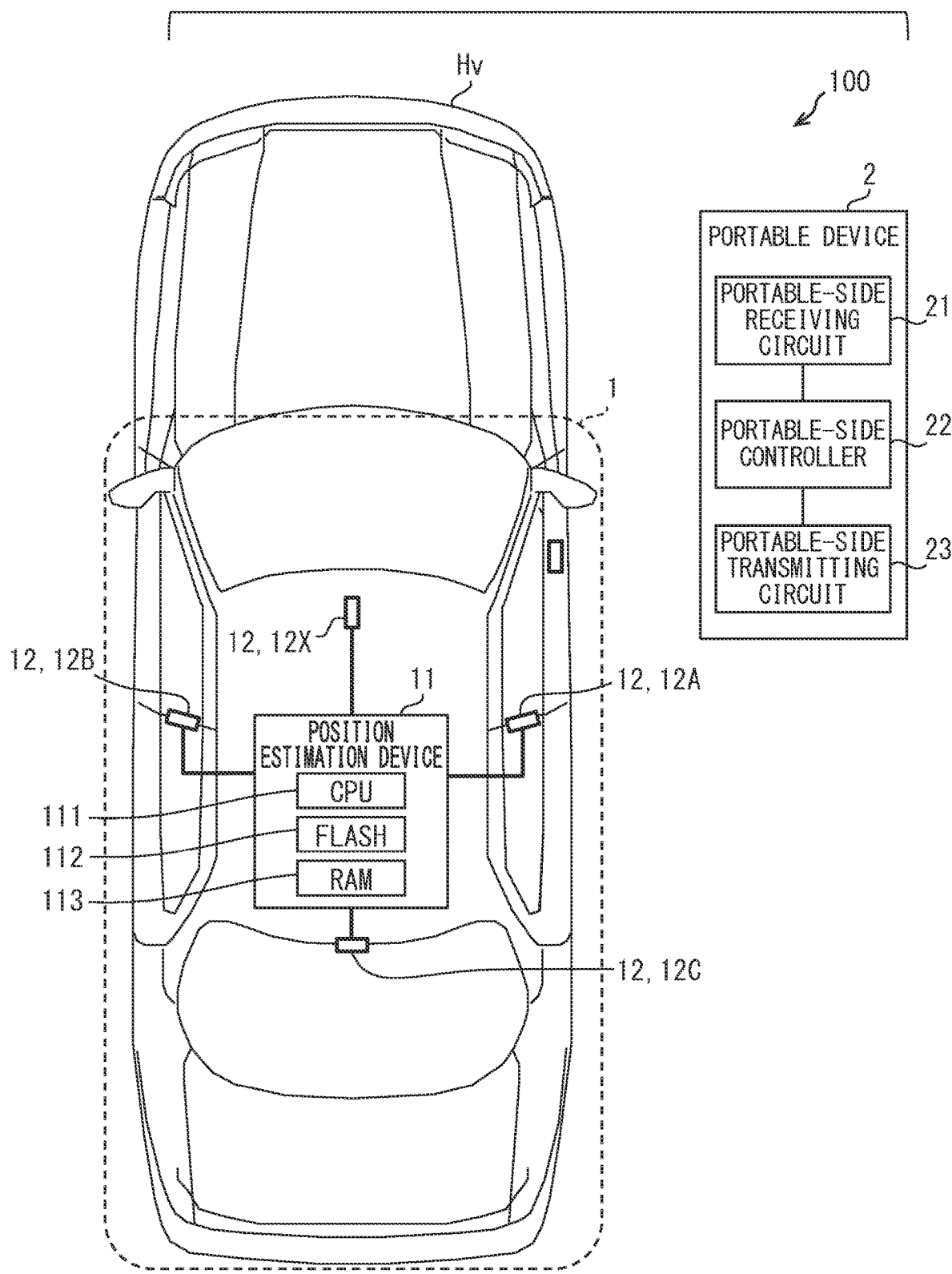
FIG. 1 is a block diagram illustrating an overall configuration of a portable device position estimation system.

There is a configuration in which a vehicle-mounted system and a portable device are configured to enable Ultra Wide Band (UWB) communication, and in which a distance of the portable device to the vehicle is estimated based on a period of time from when the vehicle-mounted system transmits an impulse signal used in the UWB communication to when the vehicle-mounted system receives a response signal from the portable device (hereinafter referred to as a "round trip time"). For convenience, a configuration provided in the vehicle-mounted system for performing wireless communication with the portable device is referred to as a vehicle-mounted communication device.

In order to estimate, using a propagation time of a signal between a portable device and a vehicle-mounted communication device, a relative position of a portable device with respect to a vehicle, it is required that, assuming the vehicle-mounted system including a plurality of vehicle-mounted communication devices (at least three or more), the distances from respective vehicle-mounted communication devices to the portable device be estimated. In order to estimate the distance from a respective vehicle-mounted communication device to the portable device, the respective vehicle-mounted communication device needs to perform wireless communication with the portable device individually.

The present disclosure is made based on these circumstances, and an object of the disclosure is to provide a portable device position estimation system that estimates a position of a portable device based on a propagation time of a wireless signal from the portable device to a vehicle-mounted system, and that is capable of suppressing the number of times wireless communications are performed between the portable device and the vehicle-mounted system for position estimation.

A first example of a portable device position estimation system is a portable device position estimation system for estimating a relative position of a portable device with respect to a vehicle by performing wireless communication in accordance with a predetermined communication method between a vehicle-mounted system mounted to a vehicle and the portable device carried by a user of the vehicle, wherein the vehicle-mounted system includes a transceiver, being a communication module, configured to transmit and receive wireless signals to and from the portable device; a plurality of intercept devices configured to receive wireless signals transmitted from the portable device and from the transceiver; and a position estimation unit that estimates the position of the portable device based on: a result of communication by the transceiver with the portable device; and states of receiving, by the plurality of respective intercept devices, of the wireless signals, wherein the transceiver is configured to transmit, as the wireless signal to the portable device, a predetermined response request signal, wherein the portable device is configured to, when the portable device receives the response request signal from the transceiver, transmit a response signal as a response, wherein the position estimation unit includes: a first propagation time determining unit that determines a first propagation time being a propagation time of the wireless signal from the transceiver to the portable device, based on a round trip time being a period of time from when the transceiver transmits the response request signal to when the transceiver receives the response signal from the portable device; a second propagation time determining unit that, for each of the plurality of the intercept devices, determines a second propagation time being a propagation time of the wireless signal from the portable device to the intercept device, based on: a signal reception interval being a period of time from when the intercept device receives the response request signal to when the intercept device receives the response signal; and the round trip time; and a position estimation processing unit that estimates the position of the portable device based on the first propagation time determined by the first propagation time determining unit and the second propagation times determined by the second propagation time determining unit.

According to the above configuration, a single transmission-and-reception of wireless signals by the transceiver and the portable device makes it possible for the position estimation unit to determine not only the first propagation time being a propagation time of the signal from the transceiver to the portable device but also the second propagation time being a propagation time of the signal from the portable device to each intercept device. The first propagation time serves as an indicator of the distance from the transceiver to the portable device, and the second propagation time for a respective intercept device serves as an indicator of the distance from the respective intercept device to the portable device. Therefore, the position of the portable device can be estimated based on the first propagation time and the second propagation times for respective intercept devices. Further, according to the above configuration, various information for estimating the position of the portable device (specifically, the first and second propagation times) is gathered in a single wireless communication. That is, according to the above configuration, the number of time the wireless communications are performed between the portable device and the vehicle-mounted system for position estimation can be suppressed in the portable device position estimation system that estimates the position of the portable device based on the propagation time of the wireless signal from the portable device to the vehicle-mounted system.

A second example of a portable device position estimation system is a portable device position estimation system for estimating a relative position of a portable device with respect to a vehicle by performing wireless communication in accordance with a predetermined communication method between a vehicle-mounted system mounted to a vehicle and the portable device carried by a user of the vehicle, wherein the portable device is configured to: transmit a response request signal being a wireless signal that requests the vehicle-mounted system to transmit, as a response, a response signal, and to: when the portable device receives the response signal, transmit to the vehicle-mounted system a time difference notification signal being a wireless signal indicating a round trip time being a period of time from receiving of the response request signal to receiving of the response signal, wherein the vehicle-mounted system comprises: a transceiver, being a communication module, configured to transmit and receive wireless signals to and from the portable device in a predetermined communication method; a plurality of intercept devices configured to receive wireless signals transmitted from the portable device and the transceiver; and a position estimation unit that estimates the position of the portable device based on: a result of communication by the transceiver with the portable device; and states of receiving, by respective interception devices, the wireless signals, wherein the transceiver is configured to, when the transceiver receives the response request signal from the portable device, transmit the response signal as a response, wherein the position estimation unit includes: a first propagation time determining unit that determines a first propagation time being a propagation time of the wireless signal from the transceiver to the portable device based on the round trip time indicated in the time difference notification signal, a second propagation time identification unit that, for each of the interception devices, determines a second propagation time being a propagation time of the wireless signal from the portable device to a respective intercept device, based on: a signal reception interval being a period of time from when the respective intercept device receives the response request signal to when the respective intercept device receives the response signal; and the round trip time, and a position estimation processing unit that estimates the position of the portable device based on: the first propagation time determined by the first propagation time determining unit; and the second propagation times determined by the second propagation time determining unit.

According to the configuration of the second example described above, a single transmission-and-reception of wireless signals by the transceiver and the portable device makes it possible for the position estimation unit to determine the first propagation time and the second propagation times for respective intercept devices, as is the case of the configuration of the first example. Therefore, the second configuration also has the same effect as the first configuration.

Hereinafter, embodiments of the present disclosure will be described with reference to the drawings.

<On Schematic Configuration of Portable Device Position Estimation System 100>

FIG. 1 illustrates an example of a schematic configuration of the portable device position estimation system 100 of the present disclosure. As shown in FIG. 1, the portable device position estimation system 100 includes a vehicle-mounted system 1 mounted to a vehicle Hv and a portable device 2 being a communication terminal carried by a user of the vehicle Hv.

The vehicle-mounted system 1 and the portable device 2 are configured to perform bidirectional wireless communications using radio waves in a predetermined frequency band. Here, as an example, the vehicle-mounted system 1 and the portable device 2 are configured to perform UWB-IR (Ultra Wide Band-Impulse Radio) wireless communication. That is, the vehicle-mounted system 1 and the portable device 2 are configured to be able to transmit and receive impulse radio waves (hereinafter referred to as "impulse signals"), which are used in ultra wide band (UWB: Ultra Wide Band) communications. An impulse signal used in UWB communication is a signal having a very short pulse width (for example, 2 ns) and having a bandwidth of 500 MHz or more (that is, ultra-wide bandwidth).

Examples of a frequency band usable used in the UWB communication (hereinafter referred to as the UWB band) include 3.2 GHz to 10.6 GHz, 3.4 GHz to 4.8 GHz, 7.25 GHz to 10.6 GHz, and 22 GHz to 29 GHz. Among these various frequency bands, the UWB band in the present embodiment refers to the band of 3.2 GHz to 10.6 GHz as an example. That is, the impulse signal in this embodiment is implemented using radio waves in the 3.2 GHz to 10.6 GHz band. The frequency band used for the impulse signal may be appropriately selected according to the country in which the portable device position estimation system 100 is used. It may be sufficient for the bandwidth of the impulse signal to be 500 MHz or more, and the bandwidth may be 1.5 GHz or more.

As a modulation method for the UWB-IR communication, various methods, such as a pulse position modulation (PPM) method in which modulation is performed using pulse generation positions, can be adopted. Specifically, on-off keying (OOK), pulse width modulation (PWM), pulse amplitude modulation (PAM), pulse code modulation (PCM), and the like can be adopted. The on-off modulation method encodes information (for example, 0 and 1) by the presence or absence of impulse signals, and the pulse width modulation method encodes information by the pulse widths. The pulse-amplitude modulation method is a method of encoding information by the amplitude of the impulse signal. The pulse-code modulation method is a method of encoding information by a combination of pulses.

For convenience, a communication device capable of performing UWB communication is referred to as a UWB communication device. The UWB communication devices include not only the portable device 2 but also the below described vehicle-mounted communication device 12 included in the vehicle-mounted system 1. The portable device 2 is configured to transmit an impulse signal as a response signal when the portable device 2 receives an impulse signal from the vehicle-mounted system 1. Specific configurations of the vehicle-mounted system 1 and the portable device 2 will be described in order below.

<On Configuration of Portable Device 2>

First, a configuration and operation of the portable device 2 will be described. The portable device 2 can be implemented using a communication terminal provided for various uses. For example, the portable device 2 is a smart phone. The portable device 2 may be an information processing terminal such as a tablet device. The portable device 2 may be a small rectangular, oval (fob type) or card type device, which is conventionally known as a smart key. In addition, the portable device 2 may be configured as a wearable device worn on a user's finger, arm, or the like.

As shown in FIG. 1, the portable device 2 includes a portable device side receiving circuit 21, a portable device side control unit 22, and a portable device side transmitting circuit 23. The portable device side control unit 22 is communicably connected to each of the portable device side receiving circuit 21 and the portable device side transmitting circuit 23.

The portable device side receiving circuit 21 is a configuration for receiving impulse signals in the UWB band. When an impulse signal is received, the portable device side receiving circuit 21 generates, via performing electrical processing on this signal such as demodulating, a receiving signal, and outputs this receiving signal to the portable device side control unit 22. The portable device side receiving circuit 21 corresponds to a configuration for receiving wireless signals from the vehicle-mounted system 1.

When the receiving signal is input from the portable device side receiving circuit 21, the portable device side control unit 22 generates a baseband signal corresponding to this receiving signal, and outputs this baseband signal to the portable device side transmitting circuit 23, the baseband signal corresponding to a response signal. The baseband signal output by the portable device side control unit 22 to the portable device side transmitting circuit 23 is modulated by the portable device side transmitting circuit 23 and transmitted as a wireless signal.

The portable device side control unit 22 may be implemented by a computer including a CPU, RAM, ROM, and the like. Alternatively, the portable device side control unit 22 may be implemented using one or more ICs. Also, the portable device side control unit 22 may be implemented using an MPU or GPU. As will be described later, the portable device side transmitting circuit 23 is a configuration that converts the baseband signal into an impulse signal and transmit the impulse signal. Therefore, the portable device side control unit 22 corresponds to a configuration that causes the portable device side transmitting circuit 23 to transmit an impulse signal as a response signal when the portable device side reception circuit 21 receives an impulse signal.

The portable device side transmitting circuit 23 generates a transmission signal via performing electrical processing, such as modulating the baseband signal input from the portable device side control unit 22, and transmits the transmission signal by the UWB communication. The portable device side transmitting circuit 23 corresponds to a configuration for transmitting a response signal to the vehicle-mounted system 1. In this regard, it takes a predetermined time (hereinafter referred to as response processing time Tα) from the time when the portable device 2 receives the impulse signal from the vehicle-mounted system 1 to the time when it transmits the impulse signal as the response signal. The response processing time Tα is determined by a hardware configuration of the portable device 2. An assumed value of the response processing time Tα can be specified in advance by testing or other means.

In addition, the portable device 2 may have an active mode and a sleep mode as operating modes. The active mode is an operating mode in which processing (processing related to reception and response) such as generating the response signal as a response to the signal transmitted from the vehicle-mounted system 1 is performable. The sleep mode is an operating mode in which power consumption is reduced by stopping some or all of the functions provided by the portable device side control unit 22. For example, the sleep mode can be a mode in which the operation of a clock oscillator (not shown) is stopped. The portable device side control unit 22 may be configured to shift to the active mode when an electric signal corresponding to the impulse signal is input from the portable device side receiving circuit 21 in the sleep mode.

<Configuration of Vehicle-Mounted System 1>

Next, the configuration of the vehicle-mounted system 1 will be described. As shown in FIG. 1, the vehicle-mounted system 1 includes a position estimation device 11 and a plurality of vehicle-mounted communication devices 12. The position estimation device 11 is an electronic control unit (so-called ECU: Electronic Control Unit) that performs a process of estimating the position of the portable device 2 based on states of receiving, by respective vehicle-mounted communication devices 12, of the wireless signal from the portable device 2 (hereinafter referred to as the position estimation process). The position estimation device 11 is configured as a computer, with a CPU 111, flash memory 112, RAM 113, I/O, and bus lines connecting these configurations. The position estimation device 11 may be implemented using a GPU or MPU instead of the CPU. It may also be implemented by a combination of CPU, GPU and/or MPU.

The flash memory 112 is a non-volatile and rewritable memory. The flash memory 112 stores a program (hereinafter, a vehicle program) for causing the computer to function as the position estimation device 11. A variety of non-transitory tangible storage media can be employed as the specific storage media for the vehicle program. The execution of the vehicle program by the CPU corresponds to the execution of the method corresponding to the vehicle program. The flash memory 112 also stores other data indicating mounting positions of respective vehicle-mounted communication devices 12 in the vehicle Hv (hereinafter, communication device position data), the assumed value of the response processing time Tα at the portable device 2, assumed values of vehicle-device-to-vehicle-device propagation times T1A, and the like. The flash memory 112 corresponds to a parameter storage unit. The assumed values may be design values determined by simulation or measured by actual testing.

The position estimation device 11 is connected to each of the plurality of vehicle-mounted communication devices 12 so as to be able to communicate with each other via, for example, a dedicated signal line. The position estimation device 11 may be connected to each of the plurality of vehicle-mounted communication devices 12 so as to be able to communicate with each other via a communication network constructed in the vehicle.

Further, the position estimation device 11 is connected to a body ECU and/or an engine ECU (not shown) so as to be able to communicate with each other via a communication network. The body ECU is an ECU that executes various processes related to vehicle body control. For example, the body ECU drives a door lock motor provided on each door based on an instruction from the position estimation device 11, and locks and unlocks each door. The engine ECU is an ECU that controls the operation of the engine mounted to the vehicle Hv. For example, when the engine ECU acquires a start instruction signal for instructing the start of the engine from the position estimation device 11, the engine ECU starts the engine. As an example, the vehicle Hv is a vehicle provided with an engine as a power source, but this is not limiting. The vehicle Hv may be so-called a hybrid vehicle including an engine and a motor as a power source, or an electric vehicle including only a motor as a power source.

The vehicle-mounted communication devices 12 are communication devices for performing wireless communication (here, the UWB communication) with the portable device 2. The operation of each vehicle-mounted communication device 12 is controlled by the position estimation device 11. Each of the plurality of vehicle-mounted communication devices 12 is configured to be capable of performing the UWB communication with other vehicle-mounted communication devices 12 mounted to the vehicle Hv as well. That is, each vehicle-mounted communication device 12 is configured to be capable of performing wireless communication with the portable device 2 and other vehicle-mounted communication devices 12. It may suffice that the number of vehicle-mounted communication devices 12 included in the vehicle-mounted system 1 is at least three. At least one of the plurality of vehicle-mounted communication devices 12 is preferably located in the vehicle interior of the vehicle Hv. Each vehicle-mounted communication device 12 is preferably arranged at a position where it can look through both the inside and outside of the vehicle interior.

The vehicle-mounted system 1 of the present embodiment includes a right-side communication device 12A, a left-side communication device 12B, a rear communication device 12C, and a front communication device 12X as the vehicle-mounted communication devices 12. The right side communication device 12A is arranged, for example, in the C pillar at a the right side portion of the vehicle. The C-pillar is the third pillar from the front. The left side communication device 12B is arranged, for example, in the C pillar at a left side portion of the vehicle. The rear communication device 12C is arranged at an upper end portion of the rear window. The front communication device 12X is arranged at an overhead console.

Each vehicle-mounted communication device 12 is preferably arranged at a position where it can well look through both the inside and outside of the vehicle interior. The reason for this is as follows. First, there is a premise that radio waves used in UWB communication are easily reflected (in other words, shielded) by metal, and therefore, a shielding object causes the radio wave to be propagated while being diffracted. In a configuration in which distance measurement is performed using the propagation time of radio waves as in the present embodiment, a distance error due to the diffraction may occur. Further, in order to determine the propagation time of the radio wave, it is necessary to receive the signal transmitted from another UWB communication device, and in this case, the diffraction by the shielding object significantly lowers the radio wave strength. That is, in a configuration where the distance is measured using the propagation time of radio waves as in the present embodiment, a preferable configuration is such a configuration that allows the reception of signals transmitted from other UWB communication devices to be normally receivable, rather than the attenuation of radio wave strength due to the diffraction.

In view of the above, it is preferable that each vehicle-mounted communication device 12 be mounted at a position where it can well look through both the inside and outside of the vehicle interior. The positions that allow it to well look through both the inside and outside of the vehicle are a ceiling of the vehicle interior and various pillars (particularly the part located at the height of the window). That is, the arrangement of the vehicle-mounted communication devices 12 as described above corresponds to an example of the arrangement in which each vehicle-mounted communication device 12 is at a position that facilitates looking through the interior and exterior of the vehicle.

The installation mode (specifically, the installation position and the number of devices installed) of the vehicle-mounted communication devices 12 is not limited to the above-described mode. For example, the right-side communication device 12A may be arranged near the A-pillar at the right side portion of the vehicle or near the outer door handle located on the door for the front seat. The left side communication device 12B may alternatively be arranged to the A-pillar at the left side portion of the vehicle or at the outer door handle located on the door for the front seat. The outer door handle refers to a gripping member (so-called door handle) provided on the outer surface of the door for opening and closing the door. The area near the outer door handle includes an inside of the outer door handle.

As another mode, the front communication device 12X may be arranged at a center portion of the ceiling of the vehicle interior. The front communication device 12X may be arranged at the center portion of the instrument panel in the width direction of the vehicle or near the center console box. Although only one front communication device 12X is shown in the drawings, more than one front communication device 12X may be provided in the vehicle interior.

The vehicle-mounted communication device 12 may be arranged to the B-pillar of the vehicle Hv. Of course, it can be arranged on the outer surface of the A-pillar or D-pillar. Furthermore, the vehicle-mounted communication device 12 may be arranged near a boundary (hereinafter referred to as a upper end portion of the side surface) between a side surface portion of the vehicle Hv and a roof portion. Such a configuration corresponds to a configuration in which the vehicle-mounted communication device 12 is arranged to a frame portion positioned at an upper side portion of the side window. The upper end portion of the side surface corresponds to a roof portion of the vehicle Hv at which an upper end portion of the door of the vehicle Hv is contact with the roof of the vehicle Hv. The vehicle-mounted system 1 may also include a vehicle-mounted communication device 12 that has a communication area inside the trunk. The vehicle-mounted system 1 may also include a vehicle-mounted communication device 12 arranged on an outer surface portion of the vehicle Hv. The outer surface portion now referred to is a body portion that is in contact with a space external to the vehicle cabin of the vehicle Hv, and includes a side surface, a rear surface, and a front surface of the vehicle Hv.

The mounting position of each vehicle-mounted communication device 12 in the vehicle Hv may be represented, for example, as a point on a two-dimensional coordinate system (hereinafter referred to as a vehicle two-dimensional coordinate system) that has the center at an arbitrarily-selected position in the vehicle Hv and that is parallel to a vehicle horizontal plane. The vehicle horizontal plane referred to herein is a plane orthogonal to the height direction of the vehicle. The X-axis forming the vehicle two-dimensional coordinate system may be parallel to the front-rear direction of the vehicle, and the Y-axis may be parallel to the vehicle width direction. The center of the two-dimensional coordinate system may be, for example, the center of the rear wheel axle. The communication device position data indicating the mounting position of each vehicle-mounted communication device 12 is stored in the flash memory 112. In the present embodiment, as a more preferable mode, each vehicle-mounted communication device 12 is provided with a unique communication device number. The communication device numbers serve as information to identify the multiple vehicle-mounted communication devices 12. In the flash memory 112, the position of each vehicle-mounted communication device 12 and its communication device number associated with each other are stored as the communication device position data.

Figure 2:
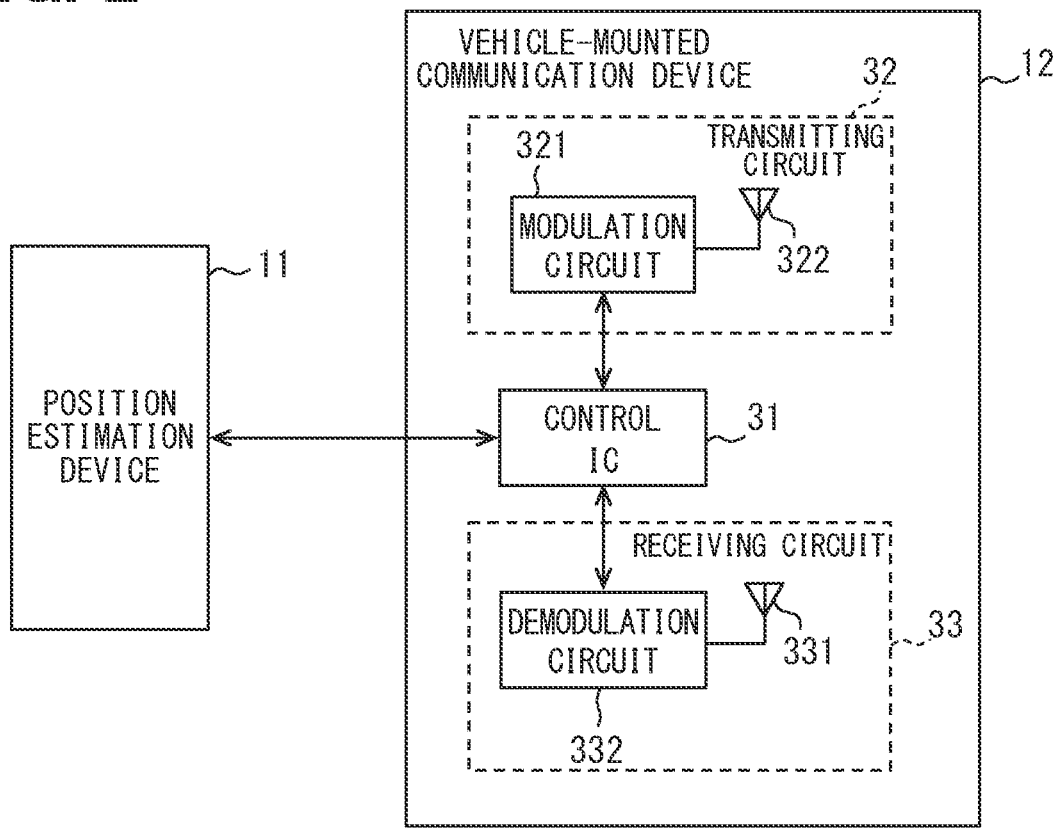
FIG. 2 is a block diagram illustrating a configuration of a vehicle-mounted communication device.

Each of the plurality of vehicle-mounted communication devices 12 includes a control IC 31, a transmitting circuit 32, and a receiving circuit 33, as shown in FIG. 2. The control IC 31 is connected to each of the transmitting circuit 32 and the receiving circuit 33. Further, the control IC 31 is further connected to the position estimation device 11 such that these are mutually communicable. The control IC 31 outputs, to the transmitting circuit 32, the baseband signal input from the position estimation device 11 and causes it to be transmitted wirelessly. The control IC 31 outputs the data received by the receiving circuit 33 to the position estimation device 11. Details of the control IC 31 will be described later.

The transmitting circuit 32 generates an impulse signal, via performing electrical processing on the baseband signal input from the control IC 31, such as modulating and the like, and causes this impulse signal to be emitted as a radio wave. The transmitting circuit 32 is implemented, for example, using a modulation circuit 321 and a transmission antenna 322.

The modulation circuit 321 is a circuit that modulates the baseband signal input from the control IC 31. The modulation circuit 321 generates a modulation signal corresponding to the data indicated by the baseband signal input from the position estimation device 11 (hereinafter referred to as transmission data) and transmits it to the transmission antenna 322. The modulation signal is a signal obtained by modulating the transmission data by a predetermined modulation method (for example, PCM modulation method). The modulation signal means a signal sequence in which a plurality of impulse signals are arranged to have time intervals corresponding to the transmission data.

The modulation circuit 321 includes a circuit that generates an electrical impulse signal (hereinafter referred to as a pulse generation circuit) and a circuit that amplifies and shapes the impulse signal. The transmitting antenna 322 is a configuration that converts the electrical impulse signals output by the modulation circuit 321 into radio waves and radiate them into space. That is, the transmitting antenna 322 radiates a pulsed radio wave with a predetermined bandwidth in the UWB band as an impulse signal. When the modulation circuit 321 outputs the electrical impulse signal to the transmission antenna 322, the modulation circuit 321 outputs a signal (hereinafter referred to as a transmission notification signal) to the control IC 31 indicating that the impulse signal has been output, in such a way that the modulation circuit 321 simultaneously outputs the electrical impulse signal and the signal indicating that the impulse signal has been output.

The transmitting circuit 32 of the present embodiment is configured such that the rise time of the impulse signal is one nanosecond. The rise time is the time required from when the signal strength exceeds 10% of the maximum amplitude for the first time until it exceeds 90% of the maximum amplitude. The rise time of the impulse signal is determined by the hardware configuration, such as the circuit configuration of the transmitting circuit 32. The rise time of the impulse signal can be specified by simulation and/or actual testing. In general, the rise time of the impulse signal in the UWB band is about 1 nanosecond.

The receiving circuit 33 is a configuration that receives wireless signals compliant with the communication standards employed in the portable device position estimation system 100, such as an impulse signal serving as a response signal transmitted from the portable device 2. The receiving circuit 33 includes, for example, a receiving antenna 331 and a demodulation circuit 332. The receiving antenna 331 is an antenna for receiving an impulse signal. The receiving antenna 331 outputs, to the demodulation circuit 332, an electrical impulse signal corresponding to the impulse signal transmitted by the portable device 2.

When the receiving antenna 331 receives the impulse signal in the UWB band, the demodulation circuit 332 performs electrical processing on this signal such as demodulating to generate a receiving signal, and outputs this receiving signal to the position estimation device 11. That is, the demodulation circuit 332 is a configuration that demodulates a series of modulation signals (hereinafter referred to as pulse series signals) comprising a plurality of impulse signals transmitted from the portable device 2 and/or other vehicle-mounted communication devices 12, and thereby restores the data that is before modulated. For example, the demodulation circuit 332 acquires, based on the impulse signals input from the receiving antenna 331, the pulse series signal transmitted by the portable device 2 or another vehicle-mounted communication device 12.

The pulse series signal acquired by the demodulation circuit 332 is such a signal that a plurality of impulse signals input from the receiving antenna 331 are arranged in chronological order to have actual reception intervals. The demodulation circuit 332 includes a frequency conversion circuit that converts the frequency of the impulse signals received by the receiving antenna 331 into a signal in a baseband and outputs it, an amplifier circuit that amplifies the signal level, and the like. In addition, when the impulse signal is input from the receiving antenna 331, the receiving circuit 33 outputs a signal indicating that the impulse signal has been received (hereinafter referred to as the receiving notification signal) to the control IC 31.

Here, the vehicle-mounted communication device 12 is illustrated as including an antenna for transmitting (i.e., the transmitting antenna 322) and an antenna for receiving (i.e., the receiving antenna 331). However, both for transmission and for reception, it may be configured to adopt a single antenna element using a directional coupler. The modulation circuit 321 and the demodulation circuit 332 may be built in the control IC 31. That is, the vehicle-mounted communication device 12 may be implemented using a single antenna and a single dedicated IC having various circuit functions.

<On Function of Control IC31>

The control IC 31 included in the vehicle-mounted communication device 12 of the present embodiment controls the operating mode of the vehicle-mounted communication device 12 based on the instructions from the position estimation device 11. The vehicle-mounted communication device 12 of this embodiment includes a host mode and an interception mode as the operating mods. The host mode is the operating mode in which the transmission of impulse signals is permitted (in other words, the right to transmit impulse signals is entitled). The host mode corresponds to the operating mode in which wireless communication with other UWB communication devices, including the portable device 2, are performable. The interception mode is the operating mode in which only the receiving of impulse signals transmitted by the portable device 2 and another vehicle-mounted communication device 12 is performed. That is, the interception mode is the operating mode for sniffering the impulse signals transmitted by the portable device 2 and another vehicle-mounted communication device 12. The interception mode corresponds, from another point of view, to an operating mode in which the transmission of impulse signals is prohibited (i.e., there is no right to speak).

Whether a respective vehicle-mounted communication device 12 operates in the host mode or in the interception mode is controlled by the position estimation device 11. That is, the control IC 31 switches the operating mode based on the control signal input from the position estimation device 11. Hereinafter, for convenience, the vehicle-mounted communication device 12 operating in the host mode will be referred to as the host device and the vehicle-mounted communication device 12 operating in the interception mode will be referred to as the intercept device. The host device corresponds to a transceiver.

The control IC 31 also performs a round trip time measurement process and a pulse reception interval measurement process using a clock signal input from a clock oscillator not shown in the drawings. The round trip time measurement process measures the round trip time Tp, which is a period of time from when the transmission circuit 32 transmits the impulse signal to when the receiving circuit 33 receives the impulse signal. The pulse reception interval measurement process measures the pulse reception interval Tq, which is a period of time from when the receiving circuit 33 receives an impulse signal to when the receiving circuit 33 receives an impulse signal again.

The measurement of the round trip time Tp and the pulse reception interval Tq may be performed by counting a clock signal input from a clock oscillator not shown in the drawings. For example, in the host mode, when the control IC 31 is instructed by the position estimation device 11 to perform the measurement of the round trip time Tp, the control IC 31 executes the round trip time measurement process. In the interception mode, when the control IC 31 is instructed by the position estimation device 11 to perform the measurement of the pulse reception interval Tq, the control IC 31 executes the pulse reception interval measurement process. The timing of the transmission of the impulse signal by the transmitting circuit 32 may be determined using the input of the transmission notification signal from the transmitting circuit 32. The timing of the reception of the impulse signal by the receiving circuit 33 may be determined using the input of the reception notification signal from the receiving circuit 33. In addition, the control IC 31 is configured to, based on the instructions from the position estimation device 11, perform bidirectional wireless communications with a given another vehicle-mounted communication device 12.

<On Function of Position Estimation Device 11>

Figure 3:
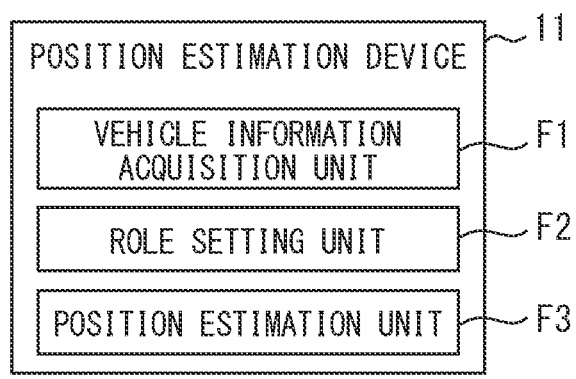
FIG. 3 is a functional block diagram of a position estimation device.

The position estimation device 11 includes a vehicle information acquisition unit F1, a role setting unit F2, and a position estimation unit F3, as shown in FIG. 3, as functions implemented by the CPU executing the vehicle program stored in the flash memory 112. Some or all of the various functional blocks provided by the position estimation device 11 may be implemented as hardware. A mode in which a certain function is implemented as hardware also includes a mode in which the certain function is implemented using one or more ICs. Further, some or all of the various functional blocks may be implemented by cooperating: the execution of software by the CPU or the like; and the hardware configuration.

The vehicle information acquisition unit F1 acquires various information indicating a state of the vehicle Hv (hereinafter referred to as vehicle information) from sensors, switches, etc. mounted to the vehicle Hv. The vehicle information includes, for example, the door open/closed state, the locked/unlocked state of each door, the shift position detected by the shift position sensor, the power state of the vehicle Hv (e.g., ignition power on/off), the parking brake operation state, etc. The types of information included in the vehicle information are not limited to those described above. The detection results of the brake sensor, which detects whether the brake pedal not shown in the drawings is depressed or not, are also included in the vehicle information.

The vehicle information acquisition unit F1 determines the current state of the vehicle Hv based on the various information described above. For example, when the engine is off and all doors are locked, the vehicle information acquisition unit F1 determines that the vehicle Hv is parked. Needless to say, the conditions for determining that the vehicle Hv is parked may be designed according various aspects, and a variety of determining conditions may be applied.

The role setting unit F2 controls the operating mode of each vehicle-mounted communication device 12. The role setting unit F2 causes any one of the plurality of vehicle-mounted communication devices 12 to operate as the host device and the reset of all to operate as the intercept devices. As an example, the role setting unit F2 of this embodiment causes the front communication device 12X to operate as the host device, while the right side communication device 12A, the left side communication device 12B, and the rear communication device 12C to operate as the intercept devices. Causing to operate as the host device corresponds to causing to operate in the host mode, i.e., assigning it to a role of communicating with the portable device 2. Also, causing to operate as the intercept device corresponds to causing to operate in the interception mode.

Figure 4:
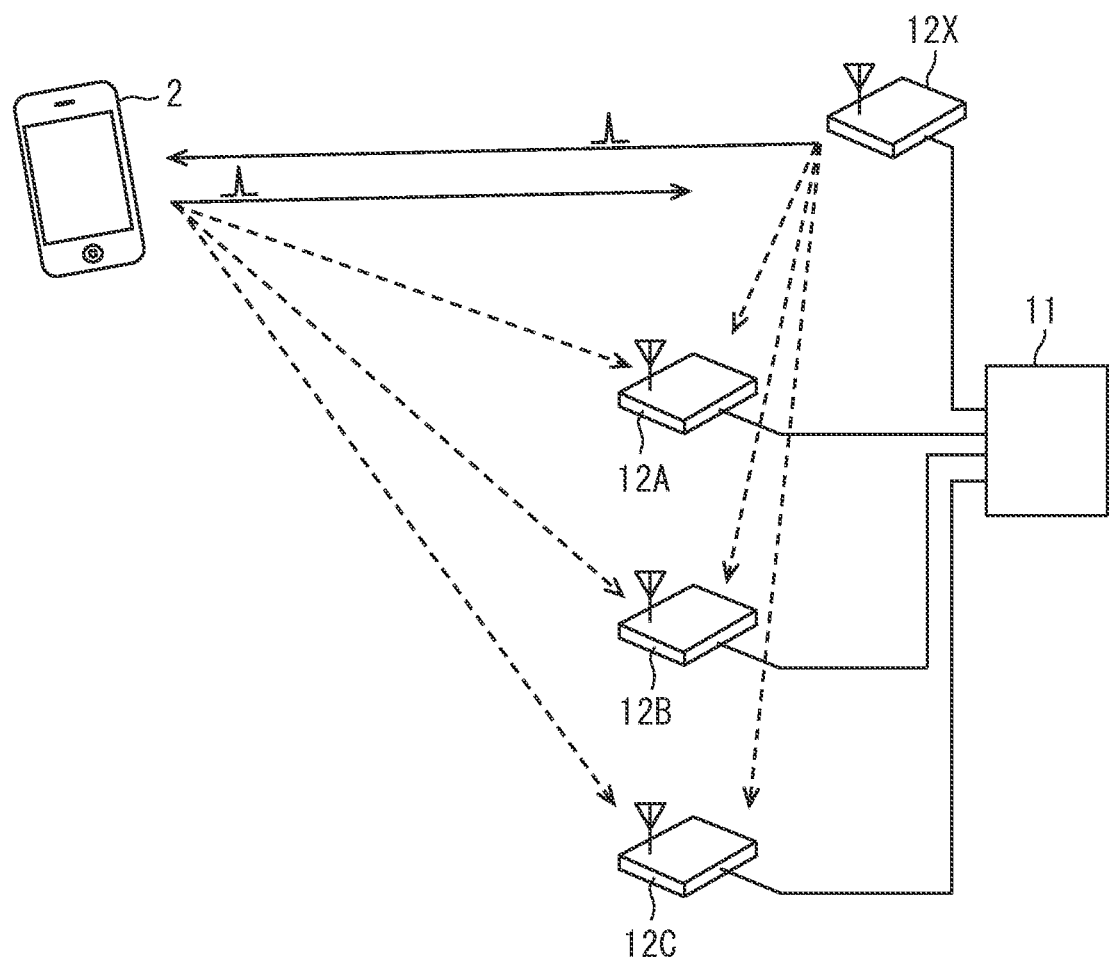
FIG. 4 is a conceptual diagram illustrating a way of communication between the vehicle-mounted system and the portable device.

FIG. 4 is a conceptual representation of the flow of wireless signals between the various configurations provided by the portable device position estimation system 100 when the above role settings are implemented. Since the front communication device 12X operates as the host device, the wireless communication with the portable device 2 is performed by the front communication device 12X. That is, the position estimation device 11 causes an impulse signal (actually a pulse series signal indicating a plurality of bit sequences) to be transmitted from the front communication device 12X to the portable device 2. When the portable device 2 receives the impulse signal from the host device, it transmits an impulse signal as a response signal. The impulse signal transmitted by the portable device 2 is received by the front communication device 12X acting as the host device. The impulse signal transmitted by the front communication device 12X acting as the host device and the impulse signal transmitted by the portable device 2 as the response signal are received by each of the intercept devices, such as the right side communication device 12A acting as the intercept devices, as shown by the dashed line in the drawing.

Figure 5:
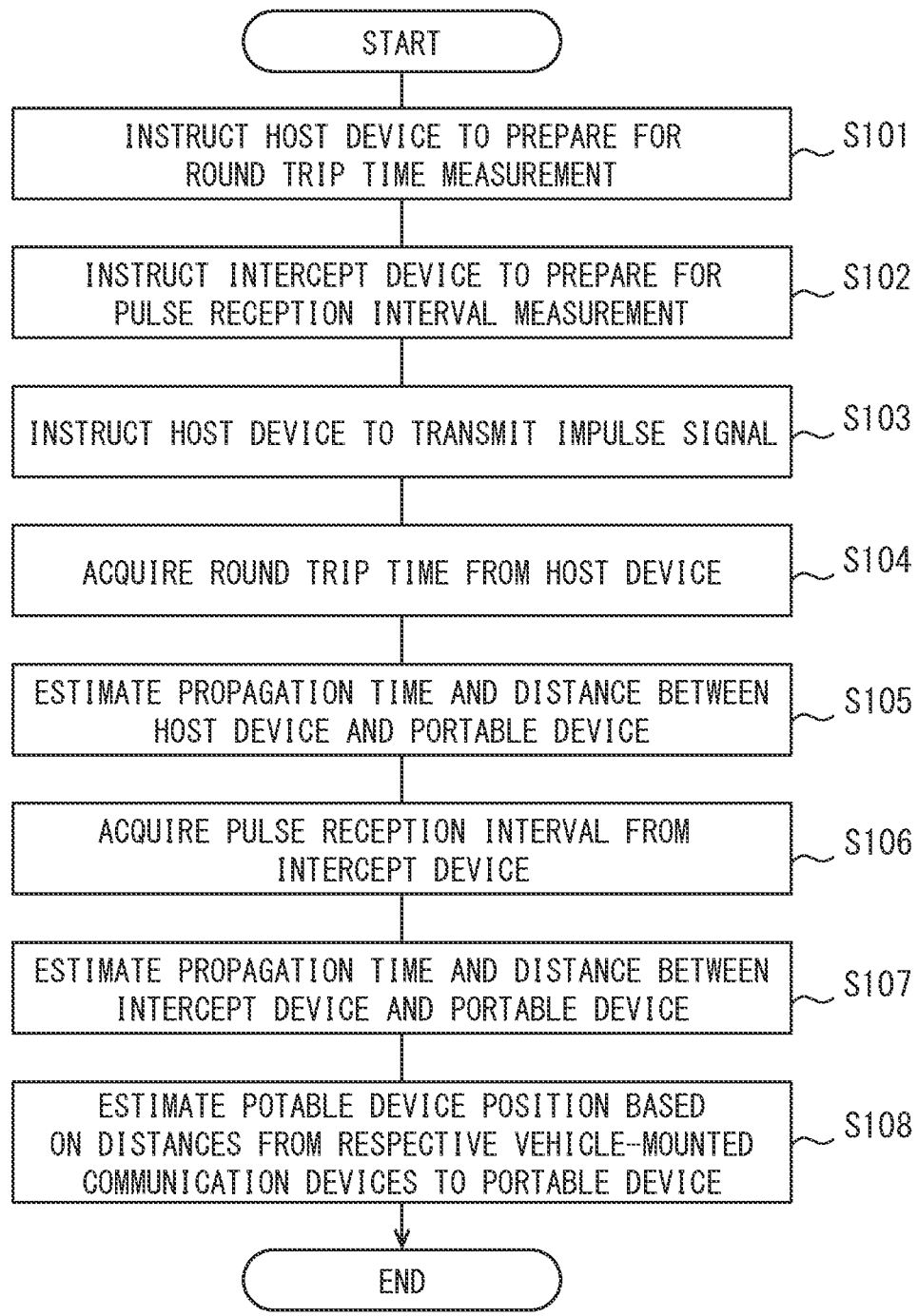
FIG. 5 is a flowchart illustrating the operation of the position estimation device.

The position estimation unit F3 is a configuration that performs the position estimation process. The position estimation process will be described using the flowchart shown in FIG. 5. The position estimation process of this embodiment includes steps S101 to S108 as an example. Each step is mainly performed by the position estimation unit F3.

The position estimation process may be performed periodically (e.g., every 200 milliseconds) at a predetermined period while the vehicle is, for example, in the parked state. The position estimation process may be configured to be performed at a predetermined period, provided that a process of authenticating the portable device 2 through cryptographic communication with the portable device 2 is successful. The authentication of the portable device 2 may be performed, for example, by a challenge-response method. Successful authentication corresponds to the determination that the vehicle-mounted system 1's communication partner is a pertaining portable device 2.

First, in step S101, an instruction to prepare to measure the round trip time Tp is issued to the host device. Responsive to this, the host device shifts to a state of ready to measure the round trip time Tp. The state of ready to measure the round trip time Tp is the state in which when the next impulse signal is transmitted, the measurement of the round trip time Tp is started. In step S102, an instruction to prepare to measure the pulse reception interval Tq is issued to each intercept device. Responsive to this, each intercept device shifts to a state of ready to measure the pulse reception interval Tq. The state of ready to measure the pulse reception interval Tq is the state in which when the next impulse signal is received, the measurement of the pulse reception interval Tq is started.

In step S103, an instruction to transmit an impulse signal is issued to the host device. Based on the instruction, the host device transmits the impulse signal to the portable device 2 and starts measuring the round trip time Tp. Thereafter, the receiving, by the host device, of the impulse signal from the portable device 2 triggers the host device to end the measurement of the round trip time Tp. The receiving, by the intercept device, of the impulse signal from the portable device 2 also triggers the intercept device to end the measurement of the pulse reception interval Tq. The pulse reception interval Tq corresponds to a signal reception interval. The intercept device is preferably configured to be able to identify whether the source of the received impulse signal is the host device or the portable device 2, by the frequency band of the signal, a code included in the signal, or the like.

In step S104, the round trip time Tp is acquired from the front communication device 12X acting as the host device. In step S105, based on the round trip time Tp, the first propagation time T12, which is the propagation time of the impulse signal from the front communication device 12X to the portable device 2, is calculated. Based on the first propagation time T12, the distance from the host device to the portable device 2 is estimated. Specifically, the one-way signal flight time is calculated by subtracting the assumed value of the response processing time Tα at the portable device 2 from the round trip time Tp, and then dividing the calculated value by 2. The one-way signal flight time from the host device to portable device 2 corresponds to a first propagation time T12. The signal flight time corresponds to a propagation time of a wireless signal. The distance from the front communication device 12X acting as the host device to the portable device 2 is then calculated by multiplying the first propagation time T12 by the propagation speed of the radio waves in the air. Step S105 corresponds to a first propagation time determining unit.

In step S106, the pulse reception intervals Tq are acquired from respective intercept devices. In step S107, the second propagation time T2A for each intercept device is estimated based on the pulse reception interval Tq and the round trip time Tp observed by a respective intercept device. The second propagation time T2A for a certain intercept device corresponds to the signal flight time taken for the impulse signal transmitted by the portable device 2 to propagate from the portable device 2 to this certain intercept device. Then, the distance from each intercept device to the portable device 2 is calculated by multiplying the second propagation time T2A for the each intercept device by the propagation speed of the radio wave. Step S107 corresponds to a second propagation time determining unit.

Figure 6:
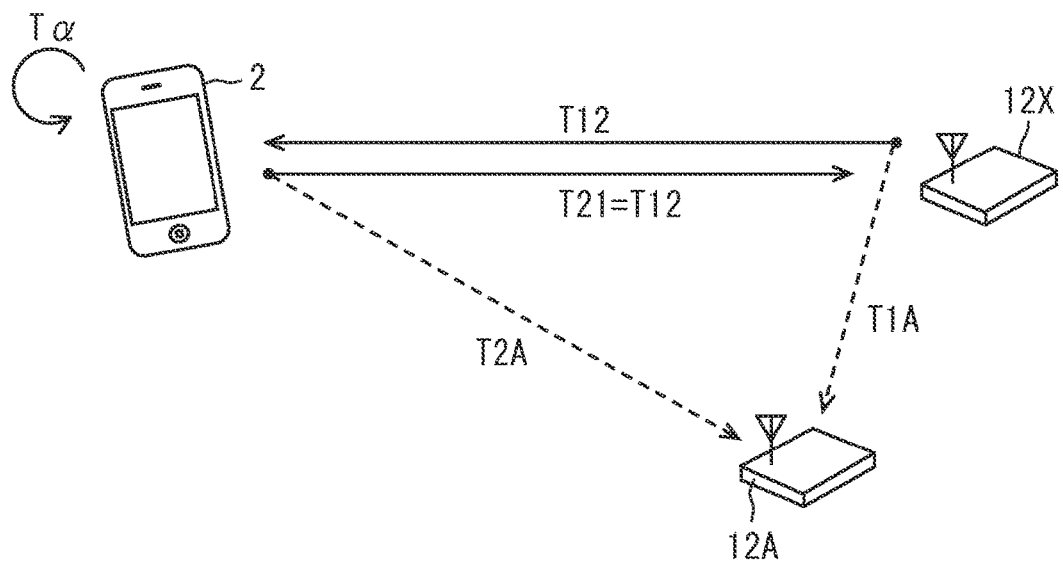
FIG. 6 is a conceptual diagram for explaining the operations of a portable device, a host device, and an intercept device.
Figure 7:
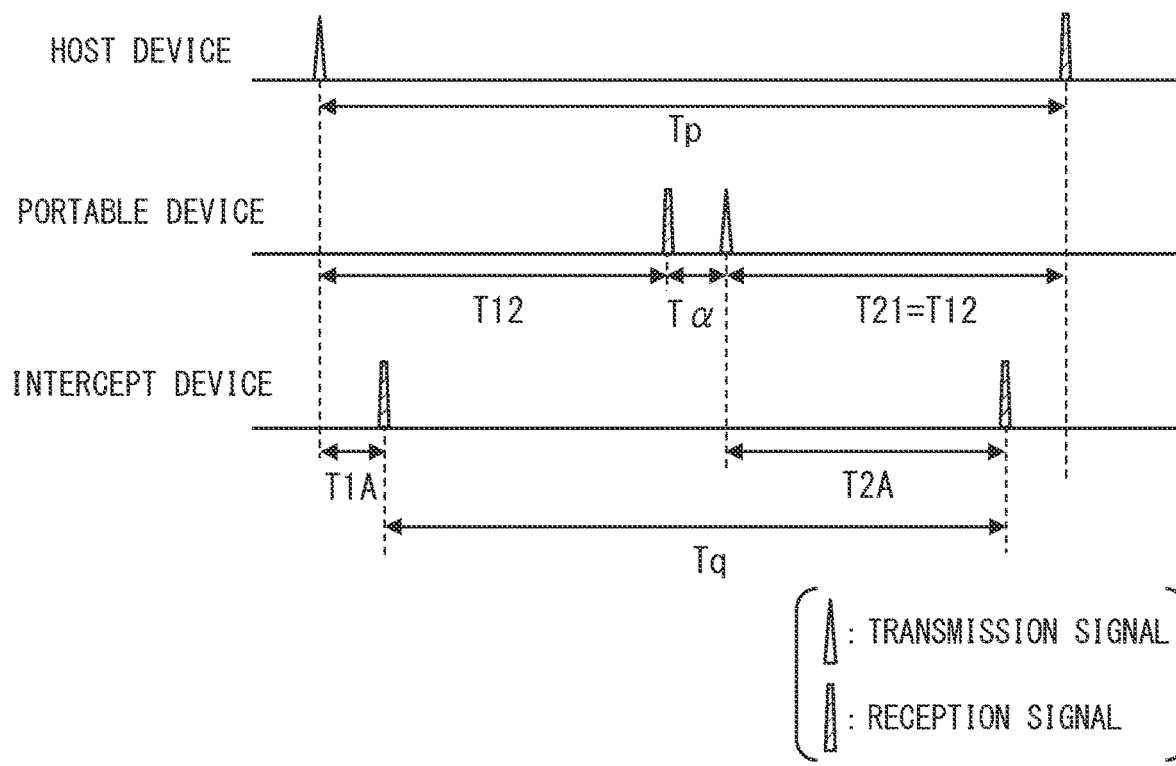
FIG. 7 is a diagram for explaining a relationship between a round trip time Tp and a pulse reception interval Tq.

FIGS. 6 and 7 will now be used to explain a relationship between the round trip time Tp and the pulse reception interval Tq observed at one intercept device (e.g., right-side communication device 12A), and feasibility of calculation of the propagation time of the signal (and thus the distance) from the portable device 2 to this intercept device based on the round trip time Tp and the pulse reception interval Tq. FIGS. 6 and 7 conceptually show the operations, in a single position estimation process, of the front communication device 12X acting as the host device, the right-side communication device 12A acting as the intercept device, and the portable device 2.

T12 in the drawing denotes the period of time taken for the impulse signal transmitted by the front communication device 12X to propagate to the portable device 2 (i.e., the first propagation time); T21 denotes the signal flight time taken for the impulse signal transmitted by the portable device 2 to propagate to the front communication device 12X. Since the propagation time of the impulse signal from the front communication device 12X to the portable device 2 can be considered the same for the outbound and inbound trips, a relation of T12=T21 is given. T1A denotes the signal flight time (hereinafter referred to as the vehicle-device-to-vehicle-device propagation time) taken for the impulse signal transmitted by the front communication device 12X to propagate to the right side communication device 12A. T2A denotes the signal flight time (that is, the second propagation time) taken for the impulse signal transmitted by the portable device 2 to propagate to the right-side communication device 12A.

The round trip time Tp is equal to the sum of: the time T12 taken for the impulse signal transmitted by the front communication device 12X to propagate to the portable device 2; the response processing time Tα at the portable device 2; and the time taken for the impulse signal transmitted by the portable device 2 to propagate to the front communication device 12X. That is, the relationship Tp=T12+T21+Tα is established. Therefore, the first propagation time T12 is determinable by substituting the round trip time Tp observed by the host device into Expression 1 below. As the response processing time Tα, the assumed value registered in the flash memory 112 may be applied. As the response processing time Tα, the actual value measured by the portable device 2 may be applied, as described separately below as the modification 1.

$$T12=(Tp-T\alpha)/2 \qquad \text{(Expression 1)}$$

Next, a method for calculating the second propagation time T2A will be described. The value given by summing up the second propagation time T2A and the first propagation time T12 and the response processing time Tα at the portable device 2 is equal to the value given by summing up the pulse reception interval Tq and the vehicle-device-to-vehicle-device propagation time T1A. Therefore, the second propagation time T2A is determinable by Expression 2 below.

$$T2A=Tq+T1A-(T12+T\alpha)=Tq+T1A-Tp/2+T\alpha/2 \qquad \text{(Expression 2)}$$

That is, as shown in the above Expression 2, the second propagation time T2A, which serves as an indicator of the distance from the portable device 2 to the right-side communication device 12A, can be calculated based on the pulse reception interval Tq, the round trip time Tp, the vehicle-device-to-vehicle-device propagation time T1A, and the response processing time Tα. That is, the above expression 2 shows that the second propagation time T2A can be calculated using the first propagation time T12.

Here, the vehicle-device-to-vehicle-device propagation time T1A is a parameter that is determined according to the distance from the front communication device 12X to the right side communication device 12A. Since the distance from the front communication device 12X to the right side communication device 12A is constant, the vehicle-device-to-vehicle-device propagation time T1A is generally constant. The flash memory 112 of the present embodiment stores the assumed value of the vehicle-device-to-vehicle-device propagation time T1A, as described above.

The position estimation unit F3 calculates the second propagation time T2A by substituting the round trip time Tp, the pulse reception interval Tq, and various parameters stored in the flash memory 112 into the Expression 2. Then, the position estimation unit F3 calculates the distance from the portable device 2 to the right-side communication device 12A by multiplying the second propagation time T2A determined by the above by the propagation speed of the radio waves in the air.

In the above, as an example, a method of calculating the second propagation time T2A and the distance from the right-side communication device 12A to the portable device 2 based on the round trip time Tp and the pulse reception interval Tq observed at the right-side communication device 12A has been described. In a similar way, the second propagation time T2A and distance (i.e., the distance between the intercept device and the portable device) from another intercept device to the portable device 2 are calculated from the pulse reception interval Tq and the round trip time Tp observed at that intercept device.

Returning to FIG. 5, when the calculation of the distances from respective intercept devices to the portable device 2 is completed in step S107, step S108 is executed. In step S108, the position of the portable device 2 with respect to the vehicle is estimated based on: the distances to the portable device 2 from the host device and to respective intercept devices (i.e., from respective vehicle-mounted communication devices); and the mounting positions of respective vehicle-mounted communication devices. The distance from the host device to the portable device 2 is derived from the first propagation time T12, and the distance from the intercept device to the portable device 2 is derived from the second propagation time T2A. Therefore, estimating the position of the portable device 2 based on the distances from the vehicle-mounted communication devices to the portable device 2 corresponds to estimating the position of the portable device 2 based on the first propagation time and the second propagation time T2A for each intercept device.

As a method of calculating the position of the portable device 2 using the position of each vehicle-mounted communication device and the distance information from each vehicle-mounted communication device to the portable device 2, a calculation algorithm used in satellite positioning systems or the like can be used. The position of the portable device 2 with respect to the vehicle Hv can be represented as a point in a two-dimensional coordinate system parallel to the road surface plane (that is, the vehicle two-dimensional coordinate system).

The position of the portable device 2 can be estimated based on the distances from at least three vehicle-mounted communication devices 12 and the positions of those three vehicle-mounted communication devices 12.

Figure 8:
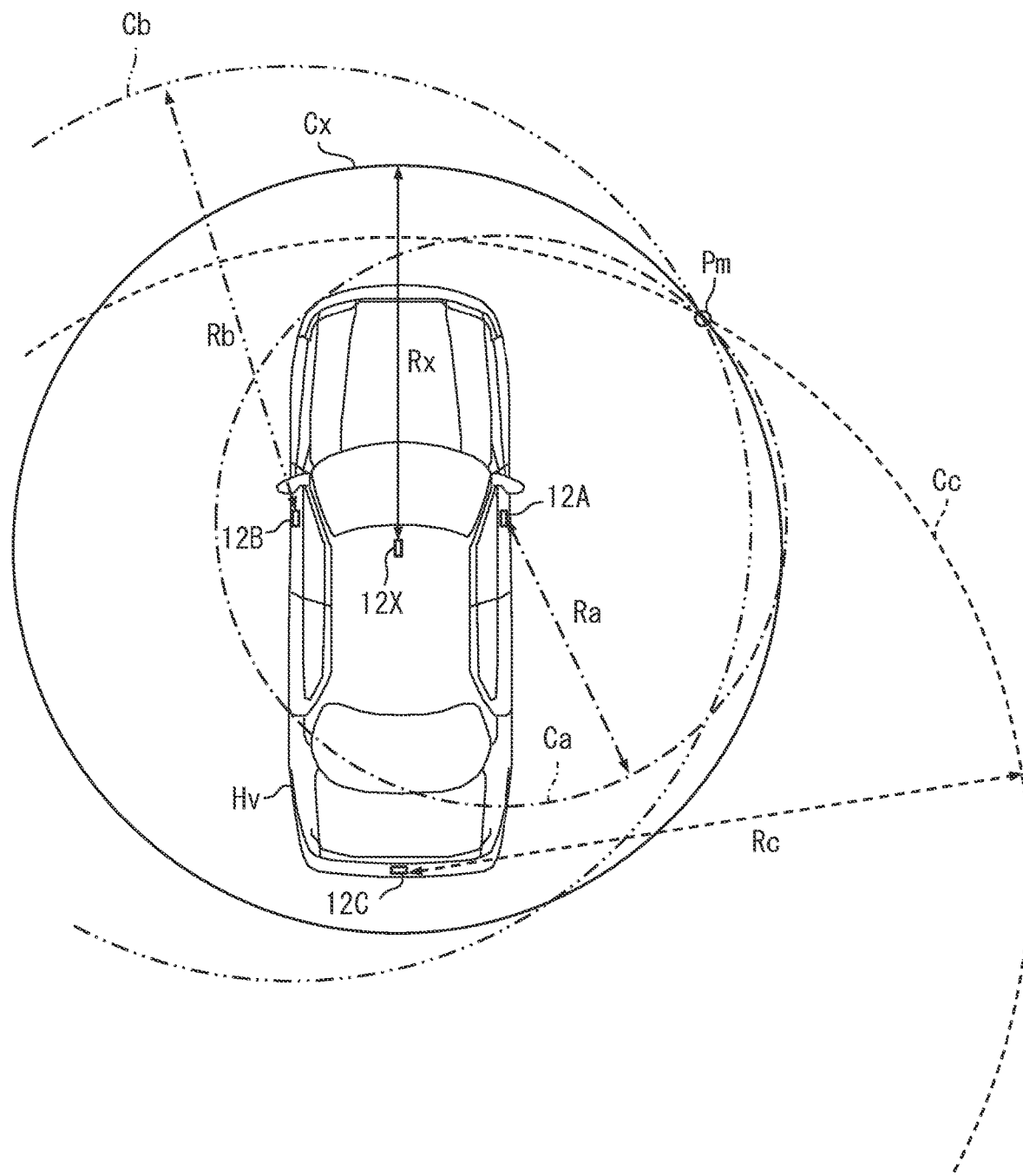
FIG. 8 is diagram for explaining a method for estimating the position of the portable device.

As conceptually shown in FIG. 8, the position of the portable device 2 corresponds to the coordinates of a point of intersection of circles (or spheres) drawn for respective vehicle-mounted communication devices 12, wherein a respective circle has the center at the mounting position of this vehicle-mounted communication device 12 and its radius is the estimated distance from this vehicle-mounted communication device 12 to the portable device 2. The circle Cx, shown as a solid line in FIG. 8, denotes a circle having the radius Rx and the center at the front communication device 12X. The radius Rx is set to the estimated distance from the front communication device 12X to the portable device 2. The circle Ca shown by the single-dotted line denotes a circle having the radius Ra and the center at the right-side communication device 12A. The radius Ra is set to the estimated distance from the right-side communication device 12A to the portable device 2. The circle Cb, indicated by the double-dotted line, denotes a circle having the radius Rb and the center at the left-side communication device 12B. The radius Rb is set to the estimated distance from the left-side communication device 12B to the portable device 2. The dotted circle Cc denotes a circle having the radius Rc and the center at the rear communication device 12C. The radius Rc is set to the estimated distance from the rear communication device 12C to the portable device 2. The point Pm in FIG. 8 denotes the position of the portable device 2. The position of the portable device 2 may be at the point where the distances from respective circle are the minimum.

<Summary of Embodiment>

In the above-mentioned embodiment, the front communication device 12X acting as the host device transmits the impulse signal for position estimation to the portable device 2, and the portable device 2 transmits the impulse signal as the response signal as a response to the impulse signal transmitted by the host device. The host device measures and reports to the position estimation device 11 the round trip time, Tp, which is the period of time from transmitting the impulse signal to the portable device 2 to receiving by the receiving circuit 33 of the impulse signal. The vehicle-mounted communication device 12 (i.e., the intercept device), other than the host device, measures and reports to the position estimation device 11 the pulse reception interval Tq, which is from the time it receives the impulse signal transmitted by the host device to the time it receives the impulse signal transmitted by the portable device 2 Then, the position estimation device 11 calculates (in other words, estimates) the position of the portable device 2 relative to the vehicle Hv based on one round-trip time and a plurality of pulse reception intervals Tq observed at respective intercept devices.

According to this configuration, the position of the portable device 2 can be estimated by a single transmission-and-reception of signals between the vehicle-mounted system 1 and the portable device 2. In other words, there is no need for a plurality of vehicle-mounted communication devices 12 to individually perform wireless communication with the portable device 2. Therefore, in the portable device position estimation system that estimates the position of the portable device 2 with respect to the vehicle Hv based on the propagation time of the wireless signal, the number of times wireless communication with the portable device 2 is performed for position estimation can be suppressed.

The embodiment of the present disclosure has been described above. The present disclosure should not be limited to the above embodiment, but has a technical scope covering various modifications described hereinafter and can also be implemented with various changes not described below without departing from the spirit and scope of the present disclosure. For example, various modifications described below can be implemented in combination as appropriate to extents that do not cause technical inconsistency. Note that portions having the same functions as those described in the above embodiment are denoted by the same reference signs, and its description will be omitted. In a case where only part of the configuration is described, the preceding embodiment is applicable to the remaining part of the configuration.

<Modification 1>

In the above-described embodiment, a design value pre-registered in the flash memory 112 (in other words, the assumed value) is used as the response processing time $T\alpha$, but this is not limiting. The portable device 2 may be configured to, using a timer not shown in the drawings, measure the response processing time taken from when the portable device 2 receives the signal from the host device to when the portable device 2 transmits the response signal as a response, and to transmit the measured response processing time $T\alpha$ to the host device by wireless communication.

Figure 9:
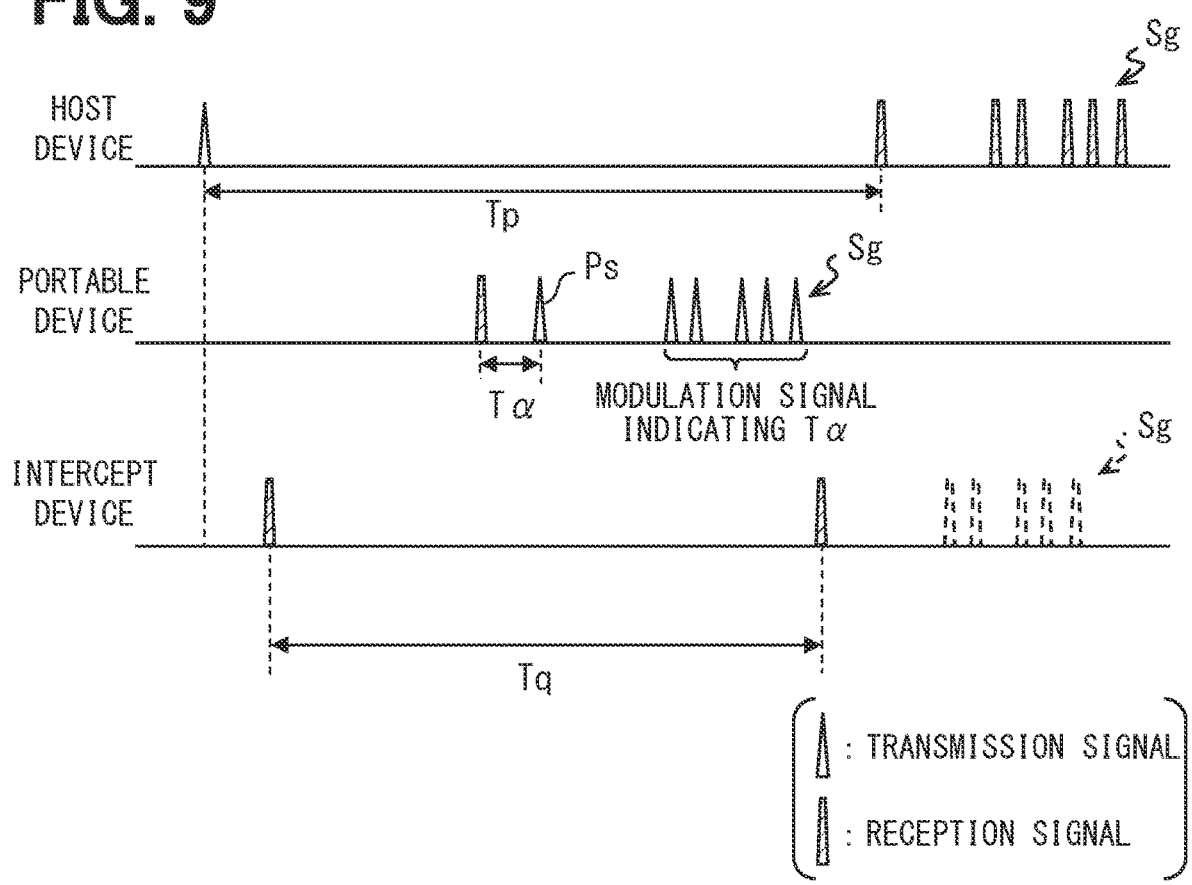
FIG. 9 is a conceptual diagram for explaining the operations of the portable device, the host device, and the intercept device in Modification 1.

As shown in FIG. 9, the response processing time $T\alpha$ measured by the portable device 2 may be notified of by a data communication that is separate from the impulse signal Ps for position estimation. For example, the portable device 2 is configured to transmit a pulse series signal (hereinafter referred to as the processing time notification signal Sg) indicating the actual measured value of the response processing time $T\alpha$ (in other words, the actual processing time) at a time when a predetermined time has elapsed since the impulse signal for position estimation was transmitted. If the actual response processing time $T\alpha$ can be represented by a single impulse signal, the portable device 2 may be configured to, in the position estimation process, transmit the impulse signal indicating the actual response processing time $T\alpha$.

When the host device of the present modification receives the processing time notification signal from the portable device 2, the host device provides the position estimation device 11 with data indicating the actual measured value of the response processing time indicated in the received processing time notification signal Sg. When the position estimation device 11 acquires the actual measured value of the response processing time from the host device, the device 11 stores the data in RAM 113 and uses it to calculate the first propagation time T12 and the second propagation time T2A for each intercept device. In the configuration, the RAM 113 corresponds to a response processing time retention unit.

According to the configuration disclosed in the modification 1, the vehicle-mounted system 1 can calculate a distance from each vehicle-mounted communication device 12 to the portable device 2 using the actual response processing time $T\alpha$ of the portable device 2. According to this configuration, the accuracy of estimating the distance from each vehicle-mounted communication device 12 to the portable device 2 can be improved. In addition, the response processing time Tα of the portable device 2 does not have to be constant, thus increasing the software extensibility of the portable device 2.

(Modification 2)

Figure 10:
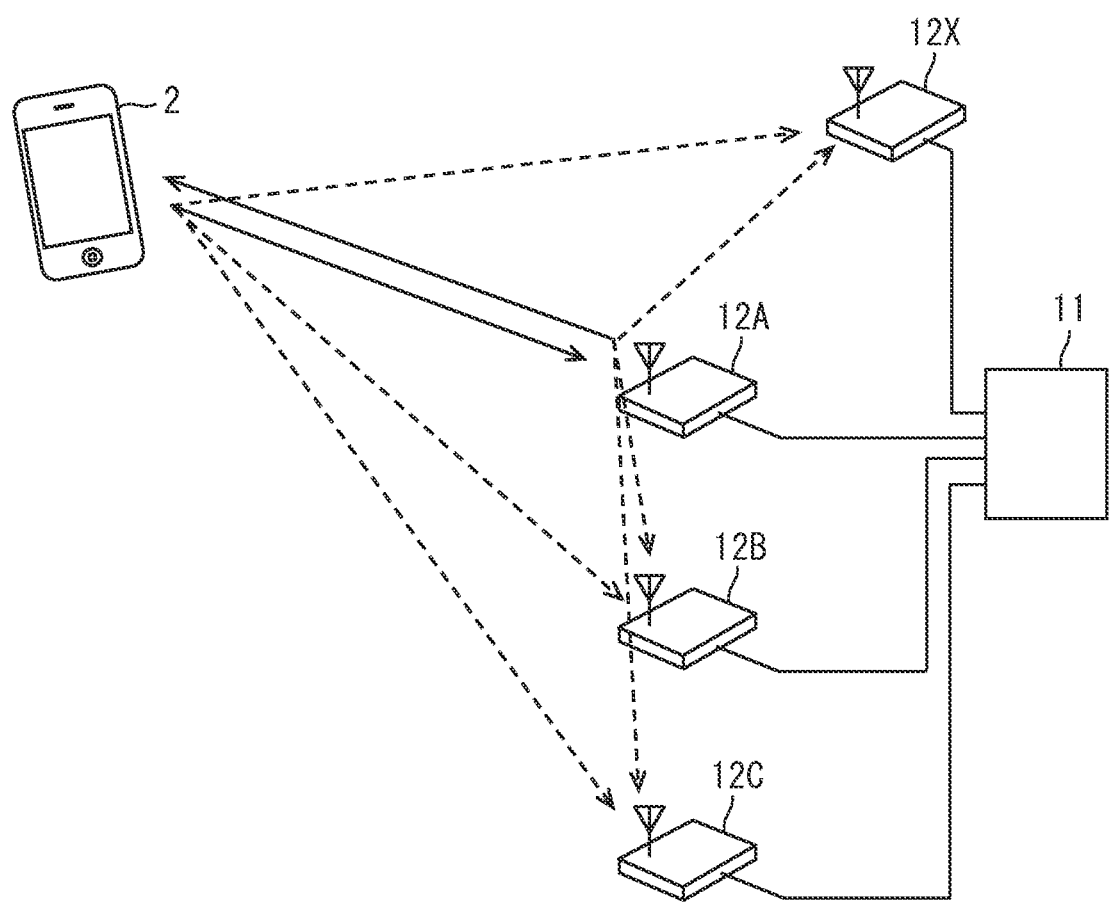
FIG. 10 is a conceptual diagram for explaining the operations of the portable device, the host device, and the intercept device in Modification 2.

The role setting unit F2 provided by the position estimation device 11 may be configured to dynamically change the vehicle-mounted communication device 12 that operates as the host device, as shown in FIG. 10. For example, each time the position estimation process is executed, the role setting unit F2 may be configured to change (in other words, replace) the vehicle-mounted communication device 12 acting as the host device in the order of the front communication device 12X, the right side communication device 12A, the left side communication device 12B, and the rear communication device 12C. This configuration corresponds to a configuration in which the host device is changed on a rotating basis.

According to this kind of configuration, even if a malfunction occurs in the front communication device 12X, as long as another vehicle-mounted communication device 12 is operating normally, the position of the portable device 2 can be estimated by causing the normal vehicle-mounted communication device 12 to operate as the host device. That is, it can increase the robustness of the portable device position estimation system.

An alternative configuration may be such that a position obtaining by averaging the results of multiple position estimation processes performed while changing the host device is adopted as the current position of the portable device 2. Since the positions of respective vehicle-mounted communication devices 12 are different, the change in the vehicle-mounted communication device 12 acting as the host device changes a degree of influence of the multipath on the round trip time Tp and the pulse reception interval Tq. Therefore, this configuration can reduce the influence of multipath caused by the environment around the vehicle Hv.

(Modification 3)

In the above-described embodiment, the design value (in other words, the assumed value) registered in the flash memory 112 is used as the vehicle-device-to-vehicle-device propagation time T1A from the host device to the intercept device, but this is not limiting. The vehicle-device-to-vehicle-device propagation time T1A may be a value measured (that is, an actually measured value) by actually performing wireless communication between the host device and each intercept device at a predetermined timing.

For example, the position estimation device 11 selects the intercept device being a measurement target (hereinafter referred to as the measurement target device) from among a plurality of intercept devices, and operates the measurement target device in an operating mode in which the measurement target device transmits an impulse signal as a response signal when the measurement target device receives an impulse signal from the host device. Then, the position estimation device 11 causes the host device to transmit the impulse signal to the measurement target intercept device.

When the measurement target intercept device receives the impulse signal from the host device, the measurement target intercept device transmits the impulse signal as the response signal. The host device acquires the period of time between transmitting the impulse signal and receiving the impulse signal from the measurement target intercept device (that is, the round trip time). The value obtained by subtracting the response processing time at the target device from the round trip time obtained by the above process and then dividing it by 2 is the vehicle-device-to-vehicle-device propagation time T1A from the host device to the target device. This calculation process may be performed by the position estimation unit F3, for example. A predetermined value can be applied as the response processing time of the target device.

When the vehicle's power supply for traveling is turned off or when the shift position is set to the parking position or the like, the wireless communication for measuring the vehicle-device-to-vehicle-device propagation time T1A may be performed, for example, as a preparatory operation for the position estimation process. The measurement target device may be changed sequentially. That is, the wireless communication for measuring the vehicle-device-to-vehicle-device propagation time T1A may be performed for each combination of the vehicle-mounted communication devices 12. The wireless communication for determining the vehicle-device-to-vehicle-device propagation time T1A may be performed periodically at a predetermined cycle independent of the position estimation process.

<Modification 4>

In relation to the above modification 3, the position estimation device 11 may determine whether the vehicle-mounted communication device 12 is mounted at a predetermined position of the vehicle, based on the vehicle-device-to-vehicle-device propagation time T1A obtained by having the bidirectional wireless communication be performed between the vehicle-mounted communication devices 12. Determining whether the vehicle-mounted communication device 12 is mounted at the predetermined position in the vehicle corresponds to determining whether a communication module as a whole has been removed from the vehicle Hv to remove the vehicle-mounted communication device 12 from the vehicle Hv and whether there is an occurrence of baseband signal relay.

If the vehicle-mounted communication device 12 has been removed from the vehicle Hv and there is an occurrence of the baseband signal relay, this corresponds to an increase in the distance between the vehicle-mounted communication devices 12, and therefore, the vehicle-device-to-vehicle-device propagation time T1A is relatively large in this case. On the other hand, when the vehicle-mounted communication device 12 is normally installed in the vehicle, the vehicle-device-to-vehicle-device propagation time T1A is expected to be within a certain range. Therefore, if the vehicle-device-to-vehicle-device propagation time T1A obtained by actual wireless communication between the vehicle-mounted communication devices 12 is outside the predetermined normal range, it indicates a possibility that the vehicle-mounted communication devices 12 has been removed from the vehicle Hv and there is an occurrence of the baseband signal relay. The normal range of the vehicle-device-to-vehicle-device propagation time T1A may be specified in advance by testing and/or other means and may be registered in the flash memory 112. The lower limit of the normal range may be set as appropriate, for example, may be 0 seconds. The normal range may be defined by the upper limit only. The upper limit of the normal range may be set to a level, such as 33 nanoseconds for example, that is supposed to not be observed when the vehicle-mounted communication device 12 is attached to the vehicle Hv. The 33 nanoseconds is a length suggesting that the distance between the vehicle-mounted communication devices 12 is about 10 meters.

While the vehicle Hv is in the parked state for example, the position estimation device 11 of the present modification periodically causes the vehicle-mounted communication devices to perform wireless communications with each other for each combination of vehicle-mounted communication devices that have such a positional relationship therebetween that makes it possible to perform the wireless communications, thereby acquiring the vehicle-device-to-vehicle-device propagation time T1A for each combination of the vehicle-mounted communication devices 12. Thereafter, it is determined whether theses vehicle-device-to-vehicle-device propagation times T1A are normal values. If there is the vehicle-device-to-vehicle-device propagation time T1A deviating from the normal range among the plurality of vehicle-device-to-vehicle-device propagation times T1A, it may be determined that the inter-vehicle communication device 12 arranged in the vehicle Hv has been removed from the vehicle Hv by removal of the communication module as a whole and that the relay is being performed at the baseband signal level.

When it is determined that the above-mentioned relay action (so-called a relay attack) is taking place, the position estimation device 11 prohibits the operation of the vehicle electronic key system, for example. The vehicle electronic key system referred to now means a system in which the vehicle-mounted system 1 and the portable device 2 communicate wirelessly with each other using radio waves in a predetermined frequency band so that the vehicle-mounted system 1 authenticates the portable device 2 and executes a predetermined vehicle control, such as unlocking the doors and starting the engine. The vehicle electronic key system corresponds to so-called a smart entry system.

When the position estimation device 11 determines that the above relay action is taking place, the position estimation device 11 may be configured to cooperate with a wide area communication device not shown in the drawings to notify of contact information (e.g., a telephone number or email address of a user or a security company) previously registered in the flash memory 112 as emergency contact information. The term "wide area communication device" here refers to a communication device for wireless access to a public communication network provided by a telecommunications carrier, such as a mobile phone network or the Internet.

According to the above configuration disclosed as the present modification, the vehicle Hv can be suppressed from being used illegally, even when the vehicle-mounted communication device 12 arranged in the vehicle Hv is removed from the vehicle Hv by removal of the module as a whole and the baseband signal level relay is taking place.

<Modification 5>

Figure 11:
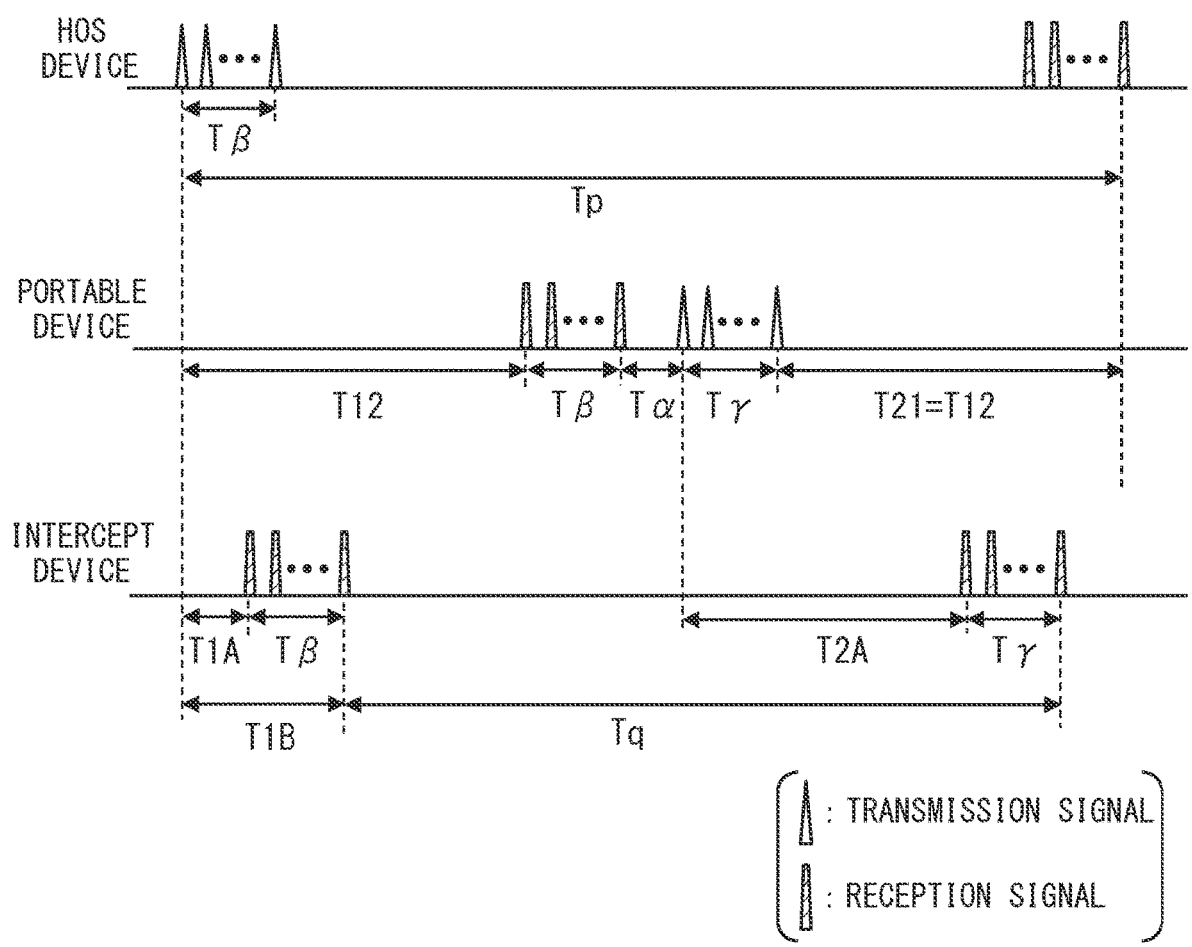
FIG. 11 is a conceptual diagram for explaining the operations of the portable device, the host device, and the intercept device in Modification 5.

The signal transmitted and received for position estimation may not be a single impulse signal, but may be a pulse series signal having a certain length, as shown in FIG. 11. An embodiment corresponding to the above idea is described below as the modification 5.

The host device in this modification transmits the pulse series signal (hereinafter referred to as the response request signal Sa) representing a certain bit string that requests the portable device 2 to transmit the response signal. The host device measures, as the round trip time Tp, for example the period of time from when the host device transmits the first impulse of the response request signal Sa to when the host device receives the end of the response signal Sb from the portable device 2. When the portable device 2 receives the response request signal Sa from the host device, the portable device 2 transmits the pulse series signal representing a certain string of bits as the response signal Sb. The length Ty (in other words, the number of bits) of the response signal Sb is preferably set the same as the length Tβ of the response request signal Sa in order to simplify the calculation process described below. Here, as an example, the setting of Tγ=Tβ is assumed. According to such the setting, the time taken for the wireless signal transmitted by the front communication device 12X to propagate to the portable device 2 (i.e., the first propagation time T12) can be determined by the following Expression 3. The lengths Tβ and Ty of the signals usable may be the assumed values stored in the flash memory 112.

$$T12=(T\beta-T\alpha-T\beta-T\gamma)/2=(TP-T\alpha-2-T\beta)/2 \quad \text{(Expression 3)}$$

The T2A, which denotes the distance from the host device to the intercept device, can be determined by Expression 4 below.

$$\begin{aligned} T2A &= Tq + T1B - T\gamma - (T12 + T\beta + T\alpha) \quad \text{(Expression 4)} \\ &= Tq + T1A + T\beta - T12 - T\beta - T\alpha \\ &= Tq + T1A + T12 - T\alpha \end{aligned}$$

In the above Expression 4, the vehicle-device-to-vehicle-device propagation time T1A may be a value registered in the flash memory 112, or a measured value determined by the method described in the modification 3. The first propagation time T12 may be determined by the above Expression 3. The response processing time Tα at the portable device 2 may be a value registered in the flash memory 112 or the actual measured value notified of by the portable device 2, as described above in the modification 1.

The position estimation unit F3 can determine the second propagation time T2A, which serves as an indicator of the distance from the portable device 2 to the intercept device, by calculating the above Expression 4. Accordingly, the distance from the portable device 2 to the intercept device can also be calculated. That is, the present modification has the same effect as the above-mentioned embodiment.

The response request signal Sa preferably includes a code indicating that the destination is the portable device 2. The response signal Sb preferably includes a code indicating that the destination is the host device and/or includes the response processing time Tα. The response signal Sb may be configured as a signal containing a response code used in the authentication process of the challenge-response method.

<Modification 6>

Figure 12:
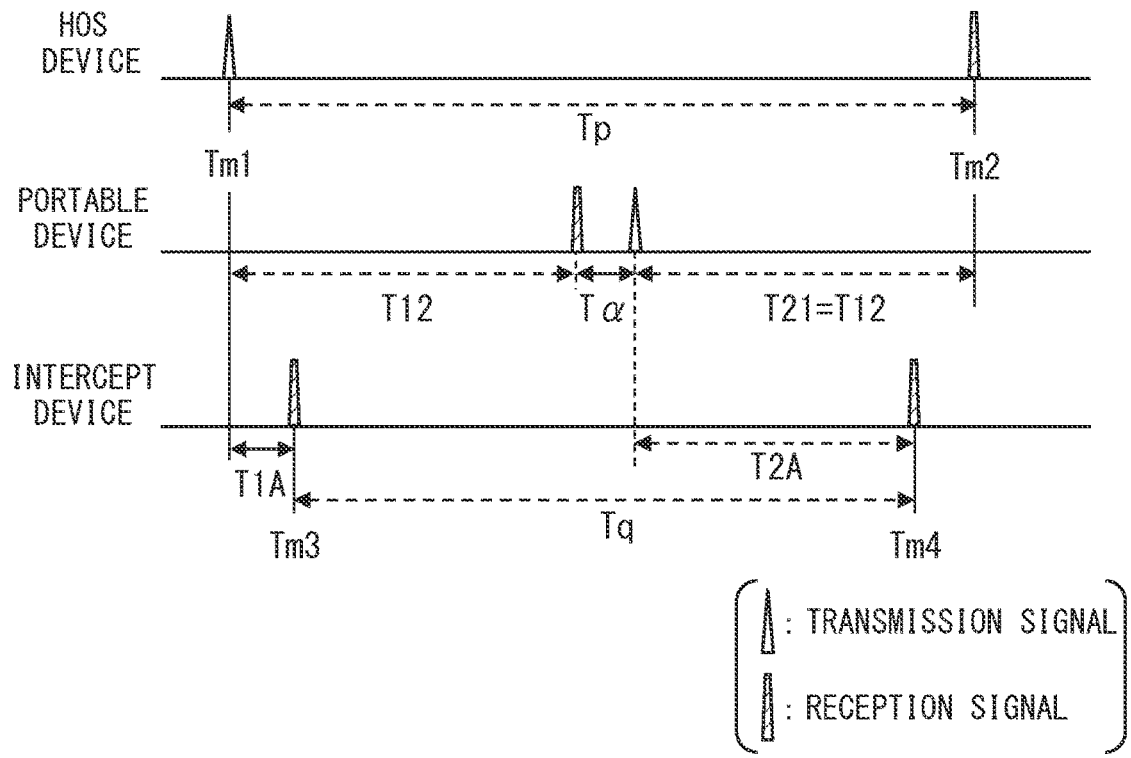
FIG. 12 is a conceptual diagram for explaining the operations of the portable device, the host device, and the intercept device in Modification 6.

In the above-described embodiment, each vehicle-mounted communication device 12 reports to the position estimation device 11 the length of time between a predetermined event occurring and a predetermined event occurring, such as the round trip time Tβ and the pulse reception interval Tq, but this is not limiting. As shown in FIG. 12, each vehicle-mounted communication device 12 may be configured to sequentially report to the position estimation device lithe time when it transmits the impulse signal and the time when it receives the impulse signal. The event here refers to the transmission of the impulse signal or the reception of the impulse signal.

The vehicle-mounted system 1 of the present modification is configured such that each vehicle-mounted communication device 12 sequentially reports the occurrences of the predetermined events to the position estimation device 11, so that the position estimation device 11 recognizes the clock times of occurrences of the various events and estimates the position of the portable device 2. Notification (in other words, reporting) of the occurrence of various events from each vehicle-mounted communication device 12 to the position estimation device 11 may be performed by the output of an electrical pulse signal.

For example, when the host device transmits the impulse signal to the position estimation device 11, the host device transmits the electrical pulse signal to the position estimation device 11, and when the host device receives the impulse signal from the portable device 2, the host device transmits the electrical pulse signal to the position estimation device 11, whereby the host device sequentially reports the impulse signal transmission timing and the impulse signal reception timing. Accordingly, the position estimation device 11 determines a first clock time Tm1, which indicates when the host device transmitted the impulse signal, and a second clock time Tm2, which indicates when the host device received the impulse signal from the portable device 2. Each time the intercept device receives the impulse signal, the intercept device outputs the electrical pulse signal indicating this to the position estimation device 11. Accordingly, the position estimation device 11 determines a third clock time Tm3, which indicates when the intercept device received the impulse signal transmitted by the host device, and a fourth clock time Tm4, which indicates when the intercept device received the impulse signal transmitted by the portable device 2. With such the configuration also, the position estimation device 11 can calculate the round trip time Tβ and the pulse reception interval Tq, and thus has the same effect as in the embodiment described above.

In this regard, the communication between the vehicle-mounted communication device 12 and the position estimation device 11 is affected by delays originating from the electrical wiring length from the vehicle-mounted communication device 12 to the position estimation device 11, the rise time of the pulse signal for notification, and the like. Therefore, the method disclosed in this modification is more likely to include errors as compared with the embodiment. In other words, the configuration of the above-described embodiment is not influenced by the electrical wiring length from the vehicle-mounted communication device 12 to the position estimating device 11 in respect of calculating the distance from the intercept device to the portable device 2, and therefore, the portable device 2 can be estimated more accurately than the configuration disclosed in the present modification.

The position estimation device 11 of the present modification may be configured to calculate the vehicle-device-to-vehicle-device propagation time T1A using a delay time that is specified in advance by testing and that originates from the electrical wiring length from the vehicle-mounted communication device 12 to the position estimation device 11 and the pulse signal generation and/or detection process. According to such the configuration, the deterioration of the estimation accuracy of the position of the portable device 2 as compared with the embodiment can be reduced.

<Modification 7>

In the modification 6, the host device and each intercept device notifies the position estimation device 11 of the timing of transmitting/receiving the impulse signal 11 by outputting an electrical pulse signal to the position estimation device 11. However, this is not limiting. When each vehicle-mounted communication device 12 has a clock function, each vehicle-mounted communication device 12 may output data indicating the clock time of occurrence of the event to the position estimation device 11 when it detects the occurrence of the predetermined event.

For example, the host device may be configured to sequentially provide data indicating the clock time of transmission and/or reception of the impulse signal, which clock times are determined based on the clock information held by the host device. Further, the intercept device may be configured to sequentially provide data indicating the clock time of reception of the impulse signal, which clock time is determined based on the clock information held by the intercept device. The transmission and reception clock times may be expressed in terms of Coordinated Universal Time (UTC), for example. The clock time of occurrence of each event may be expressed in a time system based on the frequency of the cesium atom (so-called atomic time).

<Modification 8>

In the modification 7, the position estimation device 11 can determine the timing of transmission, by the host device, of the impulse signal. Further, since the vehicle-device-to-vehicle-device propagation time T1A from the host device to each intercept device is determined according to the distance between the host device and that intercept device, the time TA is a constant value by nature, and the value registered in the flash memory 112 can be applied. Therefore, the position estimation device 11 can determine the third clock time Tm3 at which a respective intercept device receives the impulse signal transmitted by the host device, by adding the vehicle-device-to-vehicle-device propagation time T1A to the first clock time Tm1 on an intercept device by intersect device basis, the first clock time Tm1 corresponding to the timing at which the host device transmits the impulse signal.

Therefore, from the operation/configuration of the intercept device of the modification 7, it is possible to omit the configuration of reporting to the position estimation device 11 the time when the impulse signal transmitted by the host device is received. In other words, the intercept device may be configured to report only the fourth clock time Tm4. Such the configuration corresponds to a configuration including, as the operating mode of the intercept device, a partial reporting operating mode in which data indicating the clock time of reception of the impulse signal transmitted by the portable device 2 (i.e., the fourth clock time) is provided to the position estimation device 11 whereas data indicating the clock time of reception of the impulse signal transmitted by the host device (i.e., the third clock time) is not provided to the position estimation device 11. The case where the partial reporting operating mode is applied is preferably to a case where, for example, the clock information is synchronized between the position estimation device 11 and the intercept device, or where an amount of clock information deviation is known. The idea disclosed in the modification 8 is also applicable to the modification 6.

It is conceivable that the clock information on each of the vehicle-mounted communication devices may be not completely the same (in other words, there may be a deviation). Therefore, the vehicle-mounted communication devices 12 of the present modification are preferably operated in a synchronized state using signals input from the position estimation device 11 or an external source. For example, it is preferable that the position estimation device 11 of the present modification output, to each vehicle-mounted communication device 12, a signal for resolving the misalignment of clock information between the devices (in other words, for synchronization).

In another aspect, the position estimation device 11 of the present modification may be configured to determine an amount of the clock information deviation between the host device and the intercept device, and to calculate the round trip time Tβ and the pulse reception interval Tq after correcting the clock time information reported by the intercept device using the amount of the deviation. For example, the position estimation device 11 calculates an expected clock time at which the interception device receives the impulse signal transmitted by the host device, by adding the vehicle-device-to-vehicle-device propagation time T1A to the transmission clock time of the impulse signal transmitted by the host device. Then, the difference between the expected time and the actual reception clock time reported by the intercept device is adopted as the amount of the deviation of the clock information between the host device and the intercept device.

According to the above-described embodiment, the round trip time Tβ or the pulse reception interval Tq used for estimating the position of the portable device 2 is measured within an individual vehicle-mounted communication device 12, and therefore, the vehicle-mounted communication devices 12 need not be synchronized with each other. That is, the configuration of the above-described embodiment has the advantages of not needing to synchronize between the vehicle-mounted communication devices 12 and the advantages of having less estimation errors resulting from synchronization errors. Each vehicle-mounted communication device 12 of the above-described embodiments need only be equipped with a function to measure the time between the occurrence of a certain event and the occurrence of a certain event (so-called a timer), and need not be equipped with the function to maintain clock information (i.e., a clock function). Therefore, the configuration disclosed in the embodiment has the advantage of simplifying the configuration of the vehicle-mounted communication device 12 compared to the configuration disclosed in the modifications 7 and 8.

(Modification 9)

Figure 13:
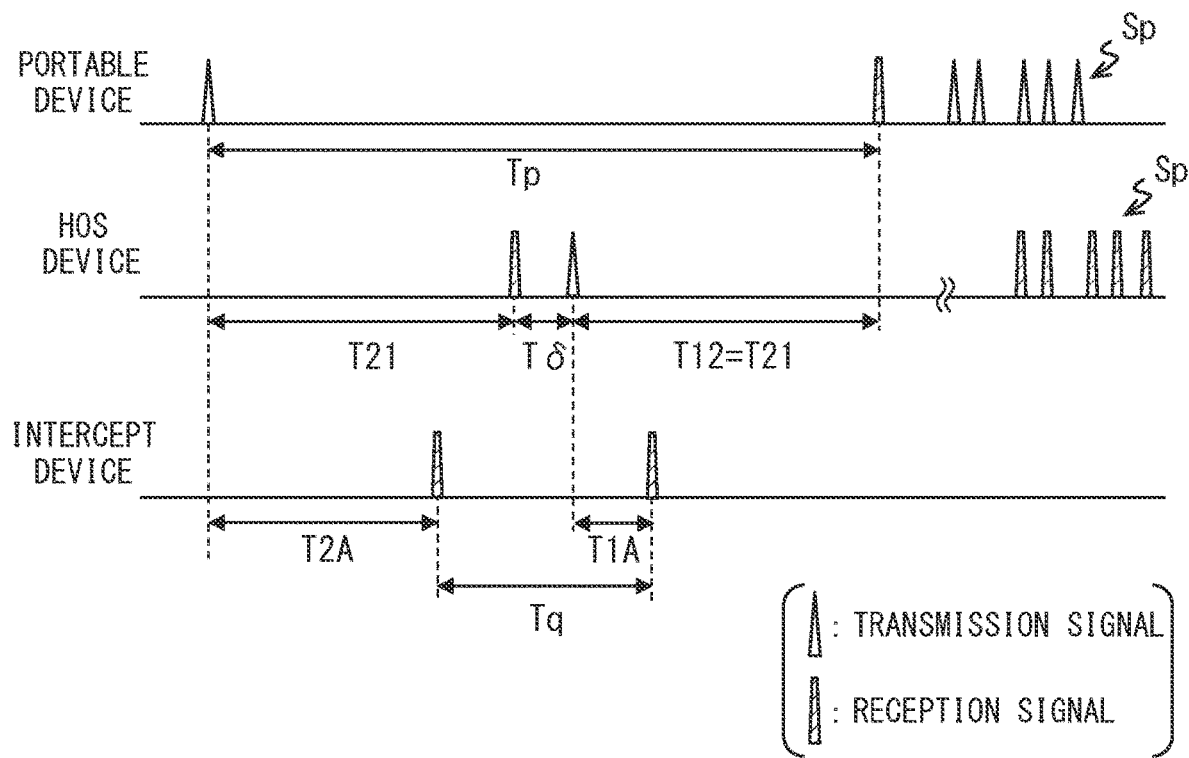
FIG. 13 is a conceptual diagram for explaining the operations of the portable device, the host device, and the intercept device in Modification 9.

In the above-described embodiment, the position of the portable device 2 is estimated by the host device transmitting the impulse signal and the portable device 2 transmitting the response signal to the impulse signal, but this is not limiting. As shown in FIG. 13, the position of the portable device 2 may be estimated by the portable device 2 transmitting the impulse signal and the host device transmitting the impulse signal as the response to the impulse signal from the portable device 2. Such the configuration will be described below as the modification 9.

The portable device 2 in this modification measures the period of time from transmitting the impulse signal to the host device to receiving the impulse signal from the host device as the round trip time Tp. A pulse series signal indicating the measured round trip time Tβ (hereinafter referred to as the time difference notification signal Sp) is transmitted separately.

When the host device receives the impulse signal from the portable device 2, the host device performs, as the response to the impulse signal, transmitting the impulse signal to the portable device 2 That is, the host device in this modification corresponds to the vehicle-mounted communication device 12 that transmits a predetermined response signal as response to the response request signal transmitted from the portable device 2. When the host device receives the time difference notification signal Sp from the portable device 2, the host device notifies the position estimation device 11 of the data indicated in the signal (specifically, the round trip time Tp).

In the present modification, the receiving, by the intercept device, of the impulse signal from the portable device 2 triggers the intercept device to start measuring the pulse reception interval Tq. That is, the intercept device measures, as the pulse reception interval Tq, the period of time from when the intercept device receives the impulse signal from the portable device 2 to when the intercept device receives the impulse signal from the host device and reports it to the position estimation device 11.

In such the configuration, the propagation time T21 (=T12) of the signal from the portable device 2 to the host device is determined by the following Expressions. In this regard, the Tδ shown in FIG. 13 represents the response processing time at the host device, which is a parameter whose specific value has been specified by testing and/or other means. In other words, the response processing time Tδ applied may be the value registered in the flash memory 112. The position estimation unit F3 of the present modification performs, as the process corresponding to step S105, calculating the first propagation time T12 by substituting the round trip time Tβ indicated in the time difference notification signal Sp into the following Expression 5.

$$T12=(T\beta-T\delta)/2 \quad \text{(Expression 5)}$$

Here, the vehicle-device-to-vehicle-device propagation time T1A adoptable may be the value registered in the flash memory 112 or the measured value determined by the method described above as the modification. T21 can be determined using the Expression 5 above, and Tq is the parameter observed by the intercept device. Tδ is the response processing time at the host device, as described above, and the value registered in the flash memory 112 can apply. Therefore, the position of the portable device 2 can be estimated by the above method as well. The position estimation unit F3 of this modification may perform the arithmetic process of the Expression as a process corresponding to step S107.

According to the above configuration, there is no need for the portable device 2 to operate in a constant reception standby state so that it can receive signals from the vehicle-mounted system 1. Therefore, the power consumption of the portable device 2 can be suppressed.

<Modification 10>

The above discloses modes in which each vehicle-mounted communication device 12 includes both the transmission function and the receiving function, but this is not limiting. If the vehicle-mounted communication devices 12 acting as the host and intercept devices are fixed, the vehicle-mounted communication device 12 acting as the intercept device may not necessarily include the transmitting circuit 32. It may be sufficient that the intercept device includes the receiving function. Specifically, when the front communication device 12X is used as the host device and the right side communication device 12A, the left side communication device 12B, and the rear communication device 12C are used as the intercept devices, the right side communication device 12A, the left side communication device 12B, and the rear communication device 12C may not necessarily include the transmitting circuit 32. It may be sufficient for the vehicle-mounted communication device 12 supposed to function as the host device to include the transmitting circuit 32.

<Additional Notes>

Means and/or functions of the position estimation device can be implemented by: software stored in in a tangible memory device and a computer that executes the software; software only; hardware only; or a combination thereof. Part or all of the functions of the position estimation device 11 may be implemented as hardware. A mode in which a certain function is implemented as hardware includes a mode in which the function is implemented by using one or more ICs or the like. When part of the functions or all of the functions of the position estimation device 11 is provided by an electronic circuit being hardware, this may be provided by: a digital circuit including multiple logic circuits; or an analog circuit. The position estimation device 11 may be provided by a single computer, or a set of computer resources linked via a data communication device.

What is claimed:

1. A portable device position estimation system for estimating a relative position of a portable device with respect to a vehicle by performing wireless communication in accordance with a predetermined communication method between a vehicle-mounted system mounted to a vehicle and the portable device carried by a user of the vehicle, wherein
the vehicle-mounted system includes:
a transceiver configured to transmit and receive wireless signals to and from the portable device;
a plurality of intercept devices configured to receive wireless signals transmitted from the portable device and from the transceiver; and
a position estimation unit that estimates the position of the portable device based on: a result of communication by the transceiver with the portable device; and states of receiving, by the plurality of respective intercept devices, of the wireless signals,
the transceiver is configured to transmit, as the wireless signal to the portable device, a predetermined response request signal,
the portable device is configured to, when the portable device receives the response request signal from the transceiver, transmit a response signal as a response,
the position estimation unit includes:
a first propagation time determining unit that determines a first propagation time being a propagation time of the wireless signal from the transceiver to the portable device, based on a round trip time being a period of time from when the transceiver transmits the response request signal to when the transceiver receives the response signal from the portable device;
a second propagation time determining unit that, for each of the plurality of the intercept devices, determines a second propagation time being a propagation time of the wireless signal from the portable device to the intercept device, based on: a signal reception interval being a period of time from when the intercept device receives the response request signal to when the intercept device receives the response signal; and the round trip time; and
a position estimation processing unit that estimates the position of the portable device based on the first propagation time determined by the first propagation time determining unit and the second propagation times determined by the second propagation time determining unit,
a plurality of transceivers are included in the vehicle-mounted system,
the vehicle-mounted system further includes a role setting unit that: sets one of the plurality of transceivers as a host device that is responsible for transmitting the response request signal to the portable device; and causes the transceivers other than the host device to function as the intercept devices, and
in a predetermined cycle, the role setting unit changes the transceiver that acts as the host device.

2. The portable device position estimation system according to claim 1, further comprising:
a parameter memory unit storing: an assumed value of a vehicle-device-to-vehicle-device transmission time taken for the wireless signal transmitted by the transceiver to be received by the intercept device; and an assumed value of a response processing time taken from when the portable device receives the response request signal to when the portable device transmits the response signal,
wherein the portable device position estimation system is configured such that:
the first propagation time determining unit calculates the first propagation time by dividing, by 2, a value obtained by subtracting the assumed value of the response processing time from the round trip time; and
the second propagation time determining unit calculates the second propagation time by: the signal reception interval plus the assumed value of the vehicle-device-to-vehicle device vehicle-device-to-vehicle-device propagation time minus the first propagation time minus the assumed value of the response processing time.

3. The portable device position estimation system according to claim 2, wherein
the portable device is configured to: measure the response processing time taken from when the portable device receives the response request signal to when the portable device transmits the response signal as a response; and to transmit a wireless signal indicating the measured response processing time as a processing time notification signal,
the position estimation unit includes a response processing time retention unit that retains the response processing time indicated in the processing time notification signal as an actual processing time when the position estimation unit receives the processing time notification signal transmitted from the portable device,
the portable device position estimation system is configured such that:
the first propagation time determining unit determines the first propagation time using the actual processing time instead of the assumed value of the response processing time registered in advance, when there is the actual processing time retained by the response processing time retention unit; and
the second propagation time determining unit determines the second propagation time using the actual processing time instead of the assumed value of the response processing time registered in advance, when there is the actual processing time retained by the response processing time retention unit.

4. The portable device position estimation system of claim 1, wherein
the transceiver is configured to perform measurement of the round-trip time and provide data indicating a result of the measurement to the position estimation unit,
the plurality of intercept devices is each configured to perform measurement of the signal reception interval and provide data indicating a result of the measurement to the position estimation unit, and
the portable device position estimation system is configured such that:
the first propagation time determining unit determines the first propagation time based on the round trip time provided by the transceiver; and.
the second propagation time determining unit determines the second propagation time for each intercept device based on the signal reception interval provided by the each intercept device and the first propagation time.

5. The portable device position estimation system of claim 1, wherein
the transceiver is configured to sequentially provide, to the position estimation unit, data indicating a clock time of transmitting the response request signal and data indicating a clock time of receiving the response signal from the portable device, the plurality of intercept devices is each configured to sequentially provide, to the position estimation unit, data indicating a clock time of receiving the response request signal and data indicating a clock time of receiving the response signal, the first propagation time determining unit is configured to determine the round trip time based on the data provided by the transceiver, and determine the first propagation time based on the round trip time, and the second propagation time determining unit is configured to determine the signal reception interval for each intercept device based on the data provided by the intercept device, and to determine the second propagation time for each intercept device based on: the signal reception interval for each intercept device and the first propagation time.

6. The portable device position estimation system of claim 5, wherein each intercept device includes an operating mode in which: the data indicating the clock time of receiving the response signal is provided to the position estimation unit while the data indicating the time of receiving the response request signal is not provided to the position estimation unit.

7. The portable device position estimation system of claim 1, wherein the portable device position estimation system comprises the vehicle-mounted system and the portable device.

8. A portable device position estimation system for estimating a relative position of a portable device with respect to a vehicle by performing wireless communication in accordance with a predetermined communication method between a vehicle-mounted system mounted to a vehicle and the portable device carried by a user of the vehicle, wherein the portable device is configured to: transmit a response request signal being a wireless signal that requests the vehicle-mounted system to transmit a response signal as a response, and to: when the portable device receives the response signal, transmit to the vehicle-mounted system a time difference notification signal being a wireless signal indicating a round trip time being a period of time from receiving of the response request signal to receiving of the response signal, the vehicle-mounted system includes:
a transceiver configured to transmit and receive wireless signals to and from the portable device in a predetermined communication method;
a plurality of intercept devices configured to receive wireless signals transmitted from the portable device and the transceiver; and
a position estimation unit that estimates the position of the portable device based on: a result of communication by the transceiver with the portable device; and states of receiving, by respective interception devices, the wireless signals, the transceiver is configured to, when the transceiver receives the response request signal from the portable device, transmit the response signal as a response, the position estimation unit includes:
a first propagation time determining unit that determines a first propagation time being a propagation time of the wireless signal from the transceiver to the portable device based on the round trip time indicated in the time difference notification signal;

a second propagation time identification unit that, for each of the interception devices, determines a second propagation time being a propagation time of the wireless signal from the portable device to a respective intercept device, based on: ae signal reception interval being a period of time from when the respective intercept device receives the response request signal to when the respective intercept device receives the response signal; and the round trip time; and a position estimation processing unit that estimates the position of the portable device based on: the first propagation time determined by the first propagation time determining unit; and the second propagation times determined by the second propagation time determining unit, a plurality of transceivers are included in the vehicle-mounted system, the vehicle-mounted system further includes a role setting unit that: sets one of the plurality of transceivers as a host device that is responsible for transmitting the response signal to the portable device; and causes the transceivers other than the host device to function as the intercept devices, and in a predetermined cycle, the role setting unit changes the transceiver that acts as the host device.

9. The portable device position estimation system of claim 8, wherein the portable device position estimation system comprises the vehicle-mounted system and the portable device.

10. A vehicle-mounted system mounted to a vehicle for estimating a relative position of a portable device with respect to the vehicle by performing wireless communication in accordance with a predetermined communication method with the portable device carried by a user of the vehicle, the vehicle-mounted system comprising three or more transceivers and a computer including a processor and a memory, the computer is configured to set one of the three or more transceivers as a host device, and set the three or more transceivers other than the host device as a plurality of intercept devices, such that in a predetermined cycle, the transceiver that acts as the host device is changed from one transceiver to another transceiver, the host device transmits and receives wireless signals to and from the portable device, the plurality of intercept devices each receives wireless signals transmitted from the portable device and from the host device, the computer is configured to estimate the position of the portable device based on: a result of communication by the host device with the portable device; and states of receiving, by the plurality of respective intercept devices, of the wireless signals, the host device is configured to transmit, as the wireless signal to the portable device, a predetermined response request signal in response to which the portable device transmit a response signal as a response to the response request signal, and the computer is configured to:
determine a first propagation time being a propagation time of the wireless signal from the host device to the portable device, based on a round trip time being a period of time from when the host device transmits the response request signal to when the host device receives the response signal from the portable device;

for each of the plurality of the intercept devices, determine a second propagation time being a propagation time of the wireless signal from the portable device to a respective intercept device, based on: a signal reception interval being a period of time from when the respective intercept device receives the response request signal to when the respective intercept device receives the response signal; and the round trip time; and estimate the position of the portable device based on the determined first propagation time and the determined second propagation times.

* * * * *